United States Patent
Basavarajappa et al.

(10) Patent No.: US 10,015,203 B2
(45) Date of Patent: Jul. 3, 2018

(54) APPARATUS, SYSTEM AND METHOD OF DIFFERENTIATING BETWEEN AN IMS CONNECTION AND A NON-IMS CONNECTION

(71) Applicant: INTEL CORPORATION, Santa Clara, CA (US)

(72) Inventors: Nitin Gowda Basavarajappa, Santa Clara, CA (US); Deepak Kumar Dash, Odisha (IN)

(73) Assignee: INTEL CORPORATION, Santa Clara, CA (US)

( * ) Notice: Subject to any disclaimer, the term of this patent is extended or adjusted under 35 U.S.C. 154(b) by 234 days.

(21) Appl. No.: 14/864,976

(22) Filed: Sep. 25, 2015

(65) Prior Publication Data

US 2016/0127422 A1    May 5, 2016

(30) Foreign Application Priority Data

Oct. 31, 2014   (IN) ............................ 5433/CHE/2014

(51) Int. Cl.
*H04L 29/06* (2006.01)
*H04W 76/16* (2018.01)
(Continued)

(52) U.S. Cl.
CPC ......... *H04L 65/1016* (2013.01); *H04W 76/11* (2018.02); *H04W 76/16* (2018.02); *H04W 76/18* (2018.02); *H04W 88/06* (2013.01)

(58) Field of Classification Search
CPC ........... H04L 65/1016; H04L 65/1096; H04W 28/0268; H04W 76/021; H04W 36/0022; H04W 36/12; H04W 76/02
See application file for complete search history.

(56) References Cited

U.S. PATENT DOCUMENTS 8,170,614 B2    5/2012  Kim
8,285,852 B2 *  10/2012 Åstrom .................. H04L 65/40
                                                        370/352
(Continued)

FOREIGN PATENT DOCUMENTS

CN         1897578     1/2007
CN       101132378     2/2008
(Continued)

OTHER PUBLICATIONS

Office Action for Taiwanese Patent Application No. 104130292, dated Nov. 10, 2016, 14 pages (Including 6 pages of English translation).

(Continued)

*Primary Examiner* — Matthew C Sams
(74) *Attorney, Agent, or Firm* — Shichrur & Co.

(57) ABSTRACT

Some demonstrative embodiments include devices, systems and methods of differentiating between an Internet Protocol (IP) Multimedia Subsystem (IMS) connection and a non-IMS connection. For example, a UE may include a communication module configured to receive from an application a request to establish a Packet Data Network (PDN) connection, and to assign an IMS tag to a traffic flow identifier of the PDN connection, wherein the IMS tag indicates that the PDN connection is an IMS connection or a non-IMS connection. The communication module may be configured to receive from the application a request to handle data packets having the traffic flow identifier, and to process the request to handle the data packets based on the IMS tag assigned to the traffic flow identifier.

24 Claims, 7 Drawing Sheets

(51) Int. Cl.
*H04W 76/11* (2018.01)
*H04W 88/06* (2009.01)
*H04W 76/18* (2018.01)

(56) References Cited

U.S. PATENT DOCUMENTS

| | | | |
|---|---|---|---|
| 8,406,741 B2 | 3/2013 | Kang et al. | |
| 8,572,261 B2* | 10/2013 | Åstrom | H04L 65/40 |
| | | | 370/352 |
| 8,874,167 B2 | 10/2014 | Qiu et al. | |
| 8,908,579 B2 | 12/2014 | Liu et al. | |
| 8,984,146 B2* | 3/2015 | Åstrom | H04L 65/40 |
| | | | 709/227 |
| 9,167,592 B1 | 10/2015 | Hsu et al. | |
| 9,210,196 B2* | 12/2015 | Astrom | H04L 65/40 |
| 9,357,431 B2* | 5/2016 | Paladugu | H04W 36/0022 |
| 9,578,568 B2* | 2/2017 | De Foy | H04L 65/1096 |
| 2002/0154632 A1 | 10/2002 | Wang et al. | |
| 2006/0291488 A1* | 12/2006 | Naqvi | H04W 92/02 |
| | | | 370/401 |
| 2006/0291489 A1* | 12/2006 | Naqvi | H04L 65/1096 |
| | | | 370/401 |
| 2009/0144429 A1* | 6/2009 | Astrom | H04L 65/40 |
| | | | 709/227 |
| 2011/0189971 A1* | 8/2011 | Faccin | H04W 76/02 |
| | | | 455/404.1 |
| 2011/0193606 A1 | 8/2011 | Sun | |
| 2012/0002548 A1* | 1/2012 | Walstrom | H04L 65/1016 |
| | | | 370/235 |
| 2012/0170552 A1* | 7/2012 | Oprescu-Surcobe | H04W 28/16 |
| | | | 370/332 |
| 2012/0210006 A1* | 8/2012 | Vihtari | H04W 4/24 |
| | | | 709/227 |
| 2012/0282915 A1 | 11/2012 | Haynes et al. | |
| 2012/0331159 A1* | 12/2012 | Srtom | H04L 65/40 |
| | | | 709/227 |
| 2013/0086653 A1* | 4/2013 | Gupta | H04W 28/0215 |
| | | | 726/5 |
| 2013/0150013 A1* | 6/2013 | Liu | H04W 8/183 |
| | | | 455/418 |
| 2013/0242918 A1* | 9/2013 | Zhou | H04W 8/082 |
| | | | 370/329 |
| 2013/0308529 A1* | 11/2013 | Schramm | H04W 76/021 |
| | | | 370/328 |
| 2014/0040489 A1* | 2/2014 | Astrom | H04L 65/40 |
| | | | 709/228 |
| 2014/0064156 A1* | 3/2014 | Paladugu | H04W 36/0022 |
| | | | 370/259 |
| 2014/0078898 A1* | 3/2014 | Anchan | H04W 28/0268 |
| | | | 370/230 |
| 2015/0188950 A1* | 7/2015 | Astrom | H04L 65/40 |
| | | | 709/228 |
| 2016/0127422 A1* | 5/2016 | Basavarajappa | H04L 65/1016 |
| | | | 455/426.1 |
| 2016/0242086 A1* | 8/2016 | De Foy | H04L 65/1096 |
| 2017/0118257 A1* | 4/2017 | De Foy | H04L 65/1096 |

FOREIGN PATENT DOCUMENTS

| | | |
|---|---|---|
| CN | 101198136 | 6/2008 |
| CN | 101217737 | 7/2008 |
| CN | 101247591 | 8/2008 |
| CN | 101345724 | 1/2009 |
| CN | 103167481 | 6/2013 |

OTHER PUBLICATIONS

Office Action for U.S. Appl. No. 14/517,868, dated Jan. 21, 2016, 14 pages.
Notice of Allowance for U.S. Appl. No. 14/517,868, dated May 31, 2016, 10 pages.
3GPP TS 36.300 V11.7.0 (Sep. 2013); Technical Specification; 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 11)), 209 pages.
U.S. Appl. No. 14/517,868, filed Oct. 19, 2014, 40 pages.
Office Action for Chinese Patent Application No. 201510599669.1, dated Jun. 28, 2017, 8 pages.
Office Action for Chinese Patent Application No. 201510599669.1, dated Jan. 31, 2018, 3 pages.
Office Action for Chinese Patent Application No. 201510633188.8, dated Mar. 21, 2018, 10 pages.

* cited by examiner

APPARATUS, SYSTEM AND METHOD OF DIFFERENTIATING BETWEEN AN IMS CONNECTION AND A NON-IMS CONNECTION

CROSS REFERENCE

This application claims priority from Indian Provisional Patent Application No. 5433/CHE/2014 entitled "APPARATUS, SYSTEM AND METHOD OF IDENTIFYING IMS-RELATED DATA PACKETS", filed Oct. 31, 2014, the entire disclosure of which is incorporated herein by reference.

TECHNICAL FIELD

Some embodiments described herein generally relate to differentiating between an Internet Protocol (IP) Multimedia Subsystem (IMS) connection and a non-IMS connection.

BACKGROUND

A wireless communication device, e.g., a mobile device, may be configured to utilize multiple wireless communication technologies.

For example, in some systems, for example, Long Term Evolution (LTE) systems, a User Equipment (UE) may be configured to communicate in a Packet Switched (PS) domain, for example, to communicate traffic of an Internet Protocol (IP) Multimedia Subsystem (IMS) service; and to communicate in a Circuit Switched (CS) domain, e.g., to communicate CS voice traffic.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

DETAILED DESCRIPTION

Figure 1:
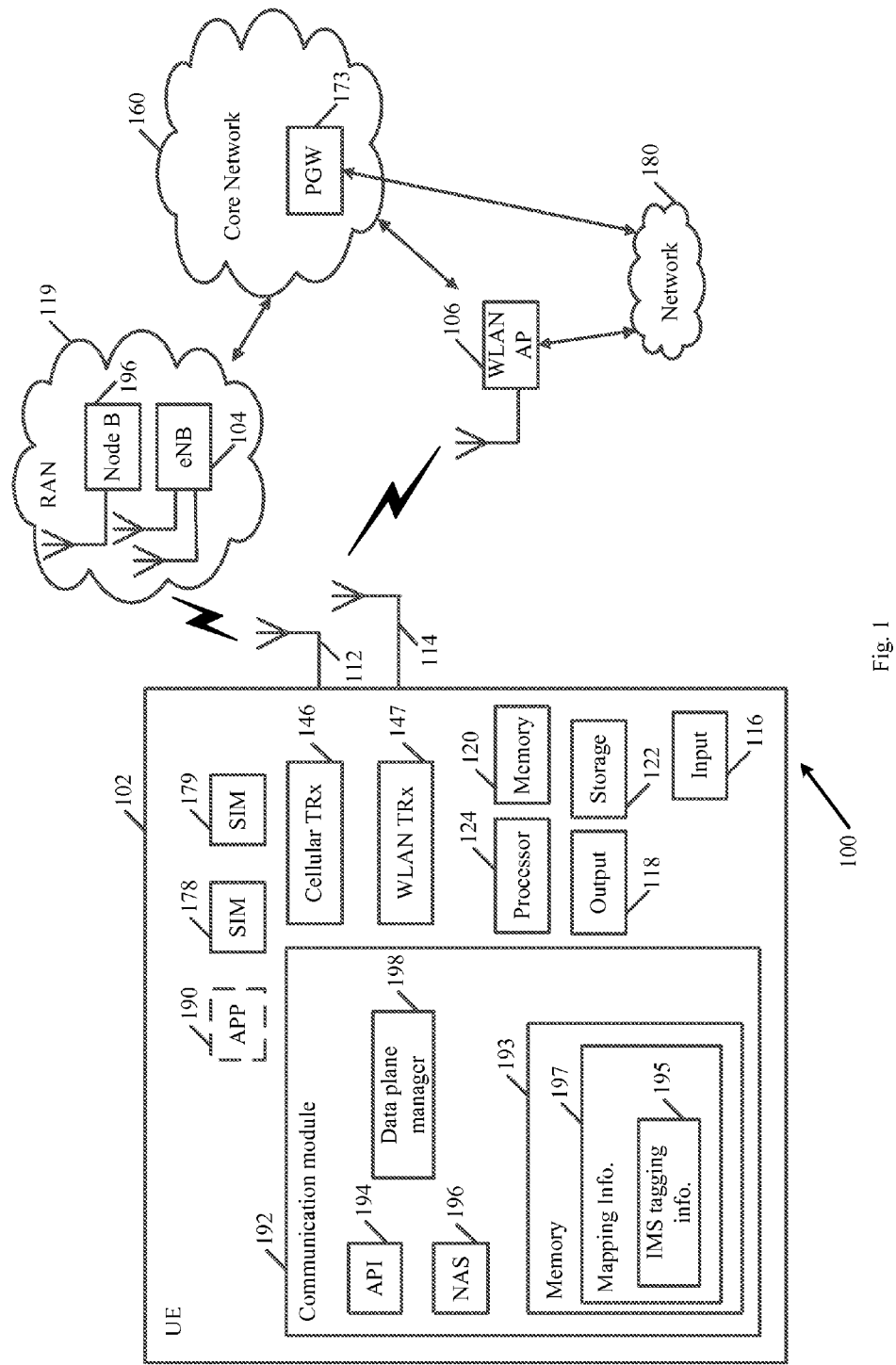
FIG. 1 is a schematic block diagram illustration of a system, in accordance with some demonstrative embodiments.

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality", as used herein, include, for example, "multiple" or "two or more". For example, "a plurality of items" includes two or more items.

References to "one embodiment," "an embodiment," "demonstrative embodiment," "various embodiments," etc., indicate that the embodiment(s) so described may include a particular feature, structure, or characteristic, but not every embodiment necessarily includes the particular feature, structure, or characteristic. Further, repeated use of the phrase "in one embodiment" does not necessarily refer to the same embodiment, although it may.

As used herein, unless otherwise specified the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

Some embodiments may be used in conjunction with various devices and systems, for example, a User Equipment (UE), a Mobile Device (MD), a wireless station (STA), a Personal Computer (PC), a desktop computer, a mobile computer, a laptop computer, a notebook computer, a tablet computer, a Smartphone device, a server computer, a handheld computer, a handheld device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wireless node, a base station (BS), a wired or wireless router, a wired or wireless modem, a video device, an audio device, an audio-video (A/V) device, a wired or wireless network, a wireless area network, a cellular network, a cellular node, a cellular device, a Wireless Local Area Network (WLAN), a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, vending machines, sell terminals, and the like.

Some embodiments may be used in conjunction with devices and/or networks operating in accordance with existing Long Term Evolution (LTE) specifications (including 3GPP TS 36.300 (3GPP TS 36.300 V11.7.0 (2013-09); Technical Specification; 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 11))), and/or future versions and/or derivatives thereof, devices and/or networks operating in accordance with existing IEEE 802.16 standards (IEEE-Std 802.16, 2009 Edition, Air Interface for Fixed Broadband Wireless Access Systems; IEEE-Std 802.16e, 2005 Edition, Physical and Medium Access Control Layers for Combined Fixed and Mobile Operation in Licensed Bands; amendment to IEEE Std 802.16-2009, developed by Task Group m) and/or future versions and/or derivatives thereof, units and/or devices which are part of the above networks, and the like.

Some embodiments may be used in conjunction with one or more types of wireless communication signals and/or systems, for example, Radio Frequency (RF), Frequency-Division Multiplexing (FDM), Orthogonal FDM (OFDM), Single Carrier Frequency Division Multiple Access (SC-FDMA), Time-Division Multiplexing (TDM), Time-Division Multiple Access (TDMA), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth®, Global Positioning System (GPS), Wireless Fidelity (Wi-Fi), Wi-Max, ZigBee™, Ultra-Wideband (UWB), Global System for Mobile communication (GSM), second generation (2G), 2.5G, 3G, 3.5G, 4G, 4.5G, Fifth Generation (5G) mobile networks, 3GPP, Long Term Evolution (LTE) cellular system, LTE advance cellular system, LTE Unlicensed systems, High-Speed Downlink Packet Access (HSDPA), High-Speed Uplink Packet Access (HSUPA), High-Speed Packet Access (HSPA), HSPA+, Single Carrier Radio Transmission Technology (1×RTT), Evolution-Data Optimized (EV-DO), Enhanced Data rates for GSM Evolution (EDGE), and the like. Other embodiments may be used in various other devices, systems and/or networks.

The term "wireless device", as used herein, includes, for example, a device capable of wireless communication, a communication device capable of wireless communication, a communication station capable of wireless communication, a portable or non-portable device capable of wireless communication, or the like. In some demonstrative embodiments, a wireless device may be or may include a peripheral that is integrated with a computer, or a peripheral that is attached to a computer. In some demonstrative embodiments, the term "wireless device" may optionally include a wireless service.

The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit. The verb "communicating" may be used to refer to the action of transmitting or the action of receiving. In one example, the phrase "communicating a signal" may refer to the action of transmitting the signal by a first device, and may not necessarily include the action of receiving the signal by a second device. In another example, the phrase "communicating a signal" may refer to the action of receiving the signal by a first device, and may not necessarily include the action of transmitting the signal by a second device.

As used herein, the term "circuitry" may refer to, be part of, or include, an Application Specific Integrated Circuit (ASIC), an integrated circuit, an electronic circuit, a processor (shared, dedicated, or group), and/or memory (shared, dedicated, or group), that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

The term "antenna", as used herein, may include any suitable configuration, structure and/or arrangement of one or more antenna elements, components, units, assemblies and/or arrays. In some embodiments, the antenna may implement transmit and receive functionalities using separate transmit and receive antenna elements. In some embodiments, the antenna may implement transmit and receive functionalities using common and/or integrated transmit/receive elements. The antenna may include, for example, a phased array antenna, a single element antenna, a dipole antenna, a set of switched beam antennas, and/or the like.

The term "cell", as used herein, may include a combination of network resources, for example, downlink and optionally uplink resources. The resources may be controlled and/or allocated, for example, by a cellular node (also referred to as a "base station"), or the like. The linking between a carrier frequency of the downlink resources and a carrier frequency of the uplink resources may be indicated in system information transmitted on the downlink resources.

Some demonstrative embodiments are described herein with respect to a LTE network. However, other embodiments may be implemented in any other suitable cellular network or system, e.g., a Universal Mobile Telecommunications System (UMTS) cellular system, a GSM network, a 3G cellular network, a 4G cellular network, a 4.5G network, a 5G cellular network, a WiMAX cellular network, and the like.

Reference is now made to FIG. 1, which schematically illustrates a block diagram of a system 100, in accordance with some demonstrative embodiments.

As shown in FIG. 1, in some demonstrative embodiments, system 100 may include one or more wireless communication devices capable of communicating content, data, information and/or signals via one or more wireless mediums, for example, a radio channel, a cellular channel, an RF channel, a Wireless Fidelity (WiFi) channel, an IR channel, and the like, e.g., as described below. One or more elements of system 100 may optionally be capable of communicating over any suitable wired communication links.

In some demonstrative embodiments, system 100 may include at least one User Equipment (UE) 102 capable of communicating with one or more wired networks 180 via at least one Radio Access Network (RAN) 119, e.g., as described below.

In some demonstrative embodiments, UE 102 may include, for example, a mobile computer, a MD, a STA, a laptop computer, a notebook computer, a tablet computer, an Ultrabook™ computer, a mobile internet device, a handheld computer, a handheld device, a storage device, a PDA device, a handheld PDA device, an Internet of Things (IoT) device, a sensor device, a wearable device, an on-board device, an off-board device, a hybrid device (e.g., combining cellular phone functionalities with PDA device functionalities), a consumer device, a vehicular device, a non-vehicular device, a mobile or portable device, a mobile phone, a cellular telephone, a PCS device, a mobile or portable GPS device, a DVB device, a relatively small computing device, a non-desktop computer, a "Carry Small Live Large" (CSLL) device, an Ultra Mobile Device (UMD), an Ultra Mobile PC (UMPC), a Mobile Internet Device (MID), an "Origami" device or computing device, a video device, an audio device, an A/V device, a gaming device, a media player, a Smartphone, or the like.

In some demonstrative embodiments, networks 180 may include one or more Packet Data Networks (PDNs). For example, networks 180 may include an Internet network, an Internet Protocol (IP) Multimedia Core Network Subsystem (IMS) network, and/or any other PDN. In other embodiments, networks 180 may include any other suitable additional and/or alternative network.

In some demonstrative embodiments, RAN 119 may include one or more cells controlled by one or more cellular nodes ("nodes"). For example, RAN 119 may include an evolved Node B (eNB) 104, a Node B 196, and/or any other cellular node, e.g., a Base Station (BS), a Base Transceiver Station (BTS), and the like.

In some demonstrative embodiments, eNB 104 may be configured to perform radio resource management (RRM), radio bearer control, radio admission control (access control), connection mobility management, resource scheduling between UEs and eNB radios, e.g., Dynamic allocation of resources to UEs in both uplink and downlink, header compression, link encryption of user data streams, packet routing of user data towards a destination, e.g., another eNB or an Evolved Packet Core (EPC), scheduling and/or transmitting paging messages, e.g., incoming calls and/or connection requests, broadcast information coordination, measurement reporting, and/or any other operations.

In some demonstrative embodiments, system 100 may include a non-cellular network, for example, a WLAN, e.g., a Basic Service Set (BSS), managed by a WLAN Access Point (AP) 106.

In some demonstrative embodiments, system 100 may also include a Core Network (CN or CNW) 160, which may be configured to provide one or more services to UE 102, and/or to setup and/or manage communication between UE 102 and RAN 119 and/or networks 180, e.g., as described below.

In some demonstrative embodiments, CN 160 may include one or more PDN Gateways (PGWs) 173 to support a PDN connection between UE 102 and a PDN of network 180.

In some demonstrative embodiments, UE 102 may include one or more wireless communication units to perform wireless communication between UE 102, RAN 119, AP 106 and/or with one or more other wireless communication devices, e.g., as described below.

In some demonstrative embodiments, UE 102 may include a cellular Transceiver (TRx) 146 to communicate with RAN 119. UE 102 may also include a WLAN TRx 147 to communicate with WLAN AP 106.

In some demonstrative embodiments, cellular TRx 146 and/or WLAN TRx 147 may include, or may be associated with, one or more antennas. In one example, UE 102 may include at least two antennas, e.g., antennas 112 and 114, or any other number of antennas, e.g., one antenna or more than two antennas.

In some demonstrative embodiments, antennas 112, and/or 114 may include any type of antennas suitable for transmitting and/or receiving wireless communication signals, blocks, frames, transmission streams, packets, messages and/or data. For example, antennas 112 and/or 114 may include any suitable configuration, structure and/or arrangement of one or more antenna elements, components, units, assemblies and/or arrays. For example, antennas 112 and/or 114 may include a phased array antenna, a dipole antenna, a single element antenna, a set of switched beam antennas, and/or the like.

In some embodiments, antennas 112 and/or 114 may implement transmit and receive functionalities using separate transmit and receive antenna elements. In some embodiments, antennas 112 and/or 114 may implement transmit and receive functionalities using common and/or integrated transmit/receive elements.

In some demonstrative embodiments, cellular TRx 146 and/or WLAN TRx 147 may include one or more wireless transmitters, receivers and/or transceivers including circuitry and/or logic able to send and/or receive wireless communication signals, RF signals, frames, blocks, transmission streams, packets, messages, data items, and/or data.

In some demonstrative embodiments, cellular transceiver 146 may be configured to communicate with RAN 119 over a cellular link.

In some demonstrative embodiments, cellular TRx 146 may include a multiple input multiple output (MIMO) transmitters receivers system (not shown) including circuitry and/or logic, which may be capable of performing antenna beamforming methods, if desired. In other embodiments, cellular TRx 146 may include any other transmitters and/or receivers.

In some demonstrative embodiments, cellular TRx 146 may include a turbo decoder and/or a turbo encoder (not shown) including circuitry and/or logic for encoding and/or decoding data bits into data symbols, if desired. In other embodiments, cellular TRx 146 may include any other encoder and/or decoder.

In some demonstrative embodiments, cellular TRx 146 may include OFDM and/or SC-FDMA modulators and/or demodulators (not shown) including circuitry and/or logic configured to communicate OFDM signals over downlink channels, e.g., between RAN 119 and UE 102, and SC-FDMA signals over uplink channels, e.g., between UE 102 and RAN 119. In other embodiments, cellular TRx 146 may include any other modulators and/or demodulators.

In some demonstrative embodiments, WLAN TRx 147 may be configured to communicate with AP 106 over a WLAN link. The WLAN link may include, for example, a Wireless Fidelity (WiFi) link, a Wireless Gigabit (WiGig) link, or any other link. In some demonstrative embodiments, the WLAN link may include, for example, a link over the 2.4 Gigahertz (GHz) or 5 GHz frequency band, the 60 GHz frequency band, and/or any other frequency band.

In some demonstrative embodiments, WLAN TRx 147 may establish a WLAN link with AP 106. For example, WLAN TRx 147 may perform the functionality of one or more STAs, e.g., one or more WiFi STAs, WLAN STAs, and/or millimeter Wave (mmWave) STAs. The WLAN link may include an uplink and/or a downlink. The WLAN downlink may include, for example, a unidirectional link from AP 106 to the one or more STAs. The uplink may include, for example, a unidirectional link from a STA to AP 106.

In some demonstrative embodiments, cellular TRx 146 may utilize the cellular link between UE 102 and RAN 119 to communicate traffic of one or more PDN connections, e.g., via one or more PGWs 173.

In some demonstrative embodiments, UE 102 may be configured to utilize an Internet Protocol (IP) Multimedia Subsystem (IMS) connection, e.g., in a Packet Switched (PS) domain and/or any other domain supporting IMS, to communicate with core network 160 via RAN 119; and/or a non-IMS connection, e.g., in a Circuit Switched (CS) domain, to communicate with core network 160 via RAN 119.

In some demonstrative embodiments, for example, in an LTE system, IMS services may be used in addition to, or instead of, equivalent services, e.g., voice services, Short Message Services (SMS), and the like, of a CS domain in non-LTE Radio-Access Technologies (RATs).

In some demonstrative embodiments, UE 102 may include a wireless communication module 192, which may be configured to control, manage, perform, cause and/or trigger one or more wireless communication operations, functionalities, and/or communications by UE 102 and/or between UE 102 an one or more other elements of system 100, e.g., as described below.

In some demonstrative embodiments, communication module 192 may include one or more elements of cellular TRx 146 and/or WLAN TRx 147. In other embodiments, communication module 192, cellular TRx and/or WLAN TRx 147 may be implemented as separate elements, units and/or components of UE 102.

In some demonstrative embodiments, communication module 192 may include, or may be implemented using, suitable circuitry and/or logic, e.g., controller circuitry and/or logic, processor circuitry and/or logic, memory circuitry and/or logic, and/or any other circuitry and/or logic, which may be configured to perform one or more operations of, and/or at least part of the functionality of, one or more elements of communication module 192, e.g., as described below. Additionally or alternatively, one or more functionalities of communication module 192 may be implemented by logic, which may be executed by a machine and/or one or more processors, e.g., as described below.

In one example, communication module 192 may include circuitry and/or logic to control, trigger and/or cause UE 102 to perform one or more operations, communications and/or functionalities, e.g., as described herein.

In some demonstrative embodiments, one or more elements of, and/or at least part of the functionality of, communication module 192 may be implemented by an integrated circuit, for example, a chip, e.g., a System on Chip (SoC). In one example, the integrated circuit, chip or SoC may be configured to perform one or more functionalities of one or more other elements of UE 102, for example, cellular TRx 146. For example, the chip or SoC may include one or more elements of communication module 192, and/or one or more elements of cellular TRx 146.

In some demonstrative embodiments, UE 102 may include an Application Protocol Interface (API) component 194 configured to interface between one or more elements of communication module 192, and at least one application 190, e.g., which may be executed by UE 102.

In some demonstrative embodiments, API 194 may be implemented as part of communication module 192, e.g., as shown in FIG. 1. In other embodiments, API 194 and communication module 192 may be implemented as separate elements of UE 102.

In some demonstrative embodiments, communication module 192 may be configured to establish one or more PDN connections between UE 102 and network 180, e.g., via RAN 119 and core network 160.

In some demonstrative embodiments, communication module 192 may be configured to establish the PDN connections based on one or more requests from the at least one application 190, and/or based on one or more requests from any other element of UE 102.

In some demonstrative embodiments, communication module 192 may be configured to establish a PDN connection as an IMS connection, or as a non-IMS connection.

In some demonstrative embodiments, in some scenarios, use cases, deployments and/or implementations, it may be advantageous, beneficial, and/or, in some cases, even critical, to differentiate between an IMS connection and a non-IMS connection, e.g., as described below.

In some demonstrative embodiments, in some scenarios, use cases, deployments and/or implementations, it may be advantageous, beneficial, and/or, in some cases, even critical, to prioritize traffic of an IMS connection, e.g., over traffic of a non-IMS connection, e.g., as described below.

In some demonstrative embodiments, in some scenarios, use cases, deployments and/or implementations, it may be advantageous, beneficial, and/or, in some cases, even critical, to process and/or handle one or more operations and/or functions corresponding to an IMS connection in a manner different from the processing and/or handling of one or more operations and/or functions corresponding to a non-IMS connection, e.g., as described below.

In some demonstrative embodiments, in one use case (also referred to as "Case 1"), a UE may be configured to operate as a multimode UE, for example, which may be configured to provide a user with voice services via an IMS connection, e.g., an IMS voice connection, for example, while the UE is connected to a network supporting IMS, e.g., an LTE network; and to provide the user with the voice services via a non-IMS connection, e.g., via a CS voice connection, for example, when the UE is connected to a network not supporting IMS, e.g., a non-LTE RAT.

In some demonstrative embodiments, according to the Case 1, an IMS call may be initiated, for example, via an IMS PDN connection. For example, the UE may establish the IMS PDN connection, based, for example, on a request, which may be received from a first application, to establish an IMS PDN connection for the IMS call.

In some demonstrative embodiments, according to the Case 1, the UE may also have an on-going communication, for example, an on-going PS data transfer via a non-IMS PDN connection. For example, the UE may establish the non-IMS PDN connection, based, for example, on a request, which may be received from a second application, to establish a non-IMS PDN connection for the PS data transfer.

In some demonstrative embodiments, according to the Case 1, the IMS call may not be successfully processed, for example, if the cell is barred for PS data, and/or for any other reason. As a result, the UE may, for example, select to attempt to fall back on the non-LTE RAT, for example, to perform a CS call on a CS domain, e.g., via a non-IMS connection, for example, if the UE is configured to support a CS domain voice call.

In some demonstrative embodiments, according to the Case 1, upon moving into a new non-LTE RAT, e.g., a 3G RAT or any other RAT, the UE may select to initiate a CS call, e.g., instead of the IMS voice call, for example, while resuming the non-IMS data transfer, e.g., for existing Packet Data Protocol (PDP) bearer contexts or Evolved Packet-switched System (EPS) bearer contexts on the new RAT.

In some demonstrative embodiments, during an Inter-RAT (IRAT) cell reselection procedure for moving to the new RAT, any buffered data packets, which may remain in a data plane of the IMS call, may cause an initiation on a data request in the new RAT, for example, if the buffered data packets are not selectively flushed.

For example, if upon connecting to the new RAT, all data packets, e.g., including the buffered IMS packets, are kept, e.g., the IMS packets are not flushed, the buffered IMS packets may result in triggering a simultaneous CS call request on the CS domain as well as an IMS voice call request on the PS domain, for example, even though the first application may have already terminated any context of the IMS Call.

In some demonstrative embodiments, there may be a need, for example, at least according to the Case 1, to distinguish the IMS related data packets from non-IMS data packets, for example, in order to avoid transmission of the buffered IMS data packets along with the non-IMS data packets, and/or in order to avoid flushing out all pending data packets, e.g., including the IMS data packets as well as the non-IMS data packets.

In some demonstrative embodiments, in another use case (also referred to as "Case 2"), a UE may be configured as a single RF and Multi-SIM capable UE, which may have two or more Subscriber Identity Modules (SIMS), e.g., Universal SIMs (USIMs), which may be able to communicate, via the same RF module, over one or more RATs, e.g., an LTE RAT and/or a 3G RAT.

In some demonstrative embodiments, according to the Case 2, the UE may include at least one SIM supporting IMS services, and at least one SIM not supporting IMS services.

For example, the UE may include a first SIM ("SIM1"), which may be LTE/3G enabled, but may have no IMS service active; and a second SIM ("SIM2"), which may be LTE/3G enabled, and may have an IMS service active.

In some demonstrative embodiments, according to the Case 2, a prioritization may be defined with respect to different types of traffic, e.g., by a user of the UE. For example, traffic of a first type, e.g., voice traffic, may be prioritized over traffic of a second type, e.g., data traffic.

In some demonstrative embodiments, according to the Case 2, there may be an ongoing PS data transfer, e.g., using the SIM1, for example, when the UE may simultaneously receive a PS data request from the SIM2.

In some demonstrative embodiments, according to the Case 2, SIM priority preferences may be set to provide priority to the SIM 1 over the SIM2. Accordingly, the request from the SIM2 may be put on-hold, e.g., until the PS data transfer of the SIM1 has been completed, or the request from the SIM2 may be rejected, for example, as the RF may be already occupied with the PS data transfer on the SIM1.

In some demonstrative embodiments, according to the Case 2, the user of the UE may initiate an IMS voice call on the SIM2, for example, during the ongoing active data transfer of the SIM1. However, although there may be a need to prioritize the voice traffic over the data traffic, if the SIM priority preferences are set to provide priority to the SIM 1 over the SIM2, the user IMS voice call request on the SIM2 may be delayed or rejected due to the ongoing data transfer in SIM1, for example, if no mechanism is provided to identify and distinguish IMS data packets of the IMS call from non-IMS data packets, for example, in order to give priority to the IMS call on the SIM2 over the ongoing non-IMS data transfer on the SIM1.

Some demonstrative embodiments may be configured to address, mitigate and/or solve one or more of the problems described above, e.g., with respect to the Case 1 and/or the Case 2. Some demonstrative embodiments may be used with respect to other additional or alternative implementations, deployments, cases, and/or scenarios, and/or to address, mitigate and/or solve any other problems, and/or to provide any other improvement and/or advantage.

In some demonstrative embodiments, communication module 192 may be configured to identify a PDN connection as an IMS connection or a non-IMS connection, e.g., as described below.

In some demonstrative embodiments, communication module 192 may be configured to differentiate between an IMS PDN connection and a non-IMS PDN connection e.g., as described below.

In some demonstrative embodiments, communication module 192 may be configured to provide IMS tagging and/or Call priority handling, for example, for IMS data, e.g., as described below.

In some demonstrative embodiments, communication module 192 may be configured to implement a mechanism to identify and/or control IMS related data packets, for example, by a user plane bearer tagging mechanism, for example, to facilitate deciding an appropriate service priority for multiple scenarios, and/or any other scenarios, implementations and/or cases, for example, in a protocol stack, e.g., as described below.

In some demonstrative embodiments, communication module 192 may be configured to mark a bearer established in data plane as an IMS related bearer or a non-IMS bearer, for example, during activation of a context of the bearer, e.g., an EPS bearer context or a PDP context, e.g., as described below.

In some demonstrative embodiments, communication module 192 may be configured to mark the bearer as an IMS related bearer or a non-IMS bearer, for example, at a Non-Access Stratum (NAS) level component and data plane entities, for example, based on information available at upper stack layers, for example, during PDN context activation, e.g., as described below.

In some demonstrative embodiments, communication module 192 may be configured to identify and/or tag one or more bearers, e.g., all bearers, which may be related to an IMS PDN, for example, with IMS tagging information in stack entities of the UE 102, e.g., as described below.

In some demonstrative embodiments, the IMS tagging information may be configured, for example, to enable one or more stack entities to identify and/or differentiate IMS data packets from non-IMS data packets, e.g., as described below.

In some demonstrative embodiments, the IMS tagging information may be configured, for example, to identify whether a data packet is an IMS packet or a non-IMS packet, for example, based on an identity of a bearer, e.g., an EPS bearer Identifier (ID) or a Network Service Access Point Identifier (NSAPI), via which the packet is to be communicated, e.g., as described below.

In some demonstrative embodiments, the IMS tagging information may be configured, for example, to support handling and/or processing of one or more operations with respect to IMS data packets, for example, while differentiating between the IMS data packets and non-IMS data packets, for example, in one or more scenarios, deployments, use cases, and/or implementations, e.g., including the Case 1 and/or the Case 2 described above and/or any other additional or alternative scenarios, deployments, use cases, and/or implementations.

In some demonstrative embodiments, communication module 192 may be configured to receive from application 190 a request to establish a PDN connection, e.g., via API 194.

In some demonstrative embodiments, communication module 192 may be configured to assign an IMS tag to a traffic flow identifier of the PDN connection, for example, upon activation of the PDN connection, e.g., as described below.

In some demonstrative embodiments, the traffic flow identifier corresponding to a PDN connection may include, for example, an EPS bearer identifier (ID), for example, if the PDN connection is established via an EPS bearer.

In some demonstrative embodiments, the traffic flow identifier corresponding to a PDN connection may include, for example, a Network Service Access Point Identifier (NSAPI), for example, if the PDN connection is established via a PDP bearer (context).

In some demonstrative embodiments, the IMS tag assigned to the traffic flow identifier may be configured to indicate that the PDN connection is an IMS connection or a non-IMS connection.

In some demonstrative embodiments, communication module 192 may be configured to store mapping information 197, e.g., in a memory 193. The mapping information 197 may be configured to map a plurality of traffic flow identifiers to IMS tagging information 195, e.g., as described below.

In some demonstrative embodiments, the IMS tagging information 195 may be configured to tag a traffic flow identifier of the plurality of traffic flow identifiers as belonging to either an IMS service or an non-IMS, e.g., as described below.

In some demonstrative embodiments, communication module 192 may be configured to use the mapping information 197, for example, to differentiate between traffic belonging to an IMS service and traffic belonging to a non-IMS service, for example, based on the traffic flow identifier corresponding to the traffic, e.g., as described below.

In some demonstrative embodiments, communication module 192 may be configured to receive from the application 190 a request to handle data packets having the traffic flow identifier, for example, via API 194, e.g., as described below.

In some demonstrative embodiments, communication module 192 may be configured to process the request to handle the data packets based on the IMS tag assigned to the traffic flow identifier, e.g., as described below.

In some demonstrative embodiments, the ability to differentiate between the data packets belonging to the IMS connection and data packets belonging to a non-IMS connection may enable, for example, to solve one or more problems, e.g., as described above with respect to Case 1 and/or Case 2, and/or to solve one or more other problems and/or provide one or more advantages.

In some demonstrative embodiments, the tagging information 195 may enable communication module 192 to differentiate between non-IMS data and IMS data, for example, at a data plane level, e.g., as described herein. It may be very complex and/or inefficient to handle one or more use cases and/or scenarios, e.g., including the Case 1 and/or Case 2, for example, without the ability to differentiate between non-IMS data and IMS data, e.g., at the data plane level.

In some demonstrative embodiments, the ability to identify and/or differentiate the packets belonging to an IMS connection, e.g., as described herein, may provide an increased level of flexibility at protocol stack entity level, and/or may enable efficient and/or easy handling of various IMS-related scenarios by stack entities, e.g., even without imposing major interworking changes at an Application layer and/or Upper layers.

In some demonstrative embodiments, communication module 192 may include a data plane manager component 198, which may be configured to assign an IMS tag to a traffic flow identifier of a PDN connection, for example, upon receipt of a request to establish a PDN connection at communication module 192, e.g., from application 190.

In some demonstrative embodiments, communication module 192 may include a NAS component module 196, which may be configured to receive the request to establish the PDN connection from application 190, e.g., via API 194.

In some demonstrative embodiments, NAS component module 196 may be configured to provide to data plane manager component 198 an activation indication, which may include, for example, the traffic flow identifier of the PDN connection and an IMS service indication corresponding to the PDN connection.

In some demonstrative embodiments, IMS information ("IMS PDN information") corresponding to the PDN connection may be obtained, for example, by upper stack layers, for example, during the PDN context activation. In one example, an application plane may provide the IMS PDN information, e.g., during IMS PDN activation request to a modem interface component. In another example, the IMS PDN information may be provided using an IM CN Subsystem Signaling Flag parameter in a Protocol Configuration Options IE, e.g., in accordance with a 3GPP 24.008 Specification. In other embodiments, any other message, field or Information Element (IE) may be used to provide the IMS PDN information.

In some demonstrative embodiments, once the IMS PDN information is retrieved, the upper layers may pass the IMS PDN information to a session management entity, which may perform an IMS tagging operation, e.g., on all PDP Context IDs and/or EPS Bearer IDs, for example, when they are activated and provide this IMS tagging information to data plane manager 198.

In some demonstrative embodiments, there may be one or more additional or alternative mechanisms of passing the IMS type information PDN from the upper layers to the data plane manager 198, e.g., in addition to, or instead of the methods described above.

In some demonstrative embodiments, data plane manager 198 may maintain a profile of NSAPIs/EPS bearers mapped to the IMS services, e.g., as described above.

In some demonstrative embodiments, upon receipt of a request to handle IMS-related data packets, data plane manager 198 may easily identify the IMS related bearers, and act upon them as needed by the use case, e.g., as described below.

In some demonstrative embodiments, data plane manager 198 and/or NAS module 196 may be configured to differentiate between traffic belonging to an IMS service and traffic belonging to a non-IMS service, for example, based on the IMS tagging information 195, e.g., as described below.

In some demonstrative embodiments, data plane manager 198 may be configured to receive a request from application 190 to handle data packets having a traffic flow identifier.

In some demonstrative embodiments, data plane manager 198 may be configured to determine an IMS tag corresponding to the traffic flow identifier of the data packets, for example, based on the IMS tagging information and the traffic flow identifier.

In some demonstrative embodiments, data plane manager 198 may be configured to process the request to handle the data packets based on the IMS tag assigned to the traffic flow identifier.

In some demonstrative embodiments, data plane manager 198 may be configured to provide to NAS module 196 the IMS tag assigned to the traffic flow identifier, e.g., as described below.

In some demonstrative embodiments, NAS module 196 may be configured to process and/or handle the data packets having the traffic flow identifier, and/or to process and/or handle communication of the data packets having the traffic flow identifier, for example, based on the IMS tag assigned to the traffic flow identifier, e.g., as described below.

In some demonstrative embodiments, NAS module 196 may be configured to prioritize communication of packets, for example, based on the IMS tag corresponding to the packets, e.g., as described below.

In some demonstrative embodiments, data plane manager 198 may be configured to provide to NAS module 196 a service request to communicate data packets. The data plane manager 198 may be configured, for example, to generate the service request to include the IMS tag assigned to the traffic flow identifier of the data packets.

In some demonstrative embodiments, NAS module 196 may be configured to prioritize communication of the data packets based on the IMS included in the service request corresponding to the data packet, e.g., as described below.

In some demonstrative embodiments, data plane manager 198 may be configured to provide to NAS module 196 at least first and second data requests. For example, the first service request may correspond to first data packets, and may include a first IMS tag indicating an IMS connection; and/or the second service request may correspond to second data packets, and may include a second IMS tag indicating a non-IMS connection.

In some demonstrative embodiments, UE 102 may include a multi-SIM UE, which may include, for example, at least a first SIM 178 and a second SIM 179.

In some demonstrative embodiments, SIM 178 and/or SIM 179 may include a USIM.

In some demonstrative embodiments, UE 102 may be configured according to a single RF and Multi-SIM scheme, e.g., which may be configured to support communication of SIM 178 and SIM 179 via a shared RF module, over one or more RATs, e.g., an LTE RAT, a 3G RAT, and/or any other RAT.

In one example, SIM 178 may be LTE/3G enabled, but may have no IMS service active; and/or SIM 179 may be LTE/3G enabled, and may have an IMS service active.

In some demonstrative embodiments, data plane manager 198 may be configured to provide the first service request corresponding to the first packets including packets from SIM 179, which may have, for example, an active IMS service.

In some demonstrative embodiments, data plane manager 198 may be configured to provide the second service request corresponding to the second packets including packets from SIM 178, which may have, for example, an ongoing data transfer of a non-IMS service.

In other embodiments, SIMs 178 and/or 179 may include any other type of SIM, and/or UE 102 may be configured according to any other SIM and/or RF configuration, e.g., including any other number of RF modules and/or supporting any other number and/or type of SIMs.

In some demonstrative embodiments, NAS module 196 may be configured to prioritize communication of the first data packets over the second data packets, for example, based on the first and second service requests from the data plane manager 198, for example, since the first service request includes the IMS tag indicating the IMS connection.

In some demonstrative embodiments, data plane manager 198 and/or NAS module 196 may be configured to process the data packets based on the IMS tagging information in the service request, for example, when a data transfer is switched from an IMS connection to a non-IMS connection, e.g., as described below.

In some demonstrative embodiments, NAS module 196 may be configured to provide to data plane manager 198 a service reject, e.g., in response to the service request, for example, when the IMS tag included in the service request indicates an IMS connection, and when a data transfer is switched from the IMS connection to a non-IMS connection.

In some demonstrative embodiments, data plane manager 198 may be configured to, e.g., in response to the service reject, flush any buffered data packets, which may belong to the IMS connection, for example, in a selective manner, e.g., without flushing data packets belonging to a non-IMS connection.

In some demonstrative embodiments, data plane manager 198 may be configured to, e.g., in response to the service reject, delete from a packet queue data packets with a traffic flow identifier, which is assigned to an IMS tag indicating the IMS connection.

In some demonstrative embodiments, UE 102 may also include, for example, one or more of a processor 124, an input unit 116, an output unit 118, a memory unit 120, and/or a storage unit 122. UE 102 may optionally include other suitable hardware components and/or software components. In some demonstrative embodiments, some or all of the components of UE 102 may be enclosed in a common housing or packaging, and may be interconnected or operably associated using one or more wired or wireless links.

In some demonstrative embodiments, processor 124 may include, for example, a Central Processing Unit (CPU), a Digital Signal Processor (DSP), one or more processor cores, a single-core processor, a dual-core processor, a multiple-core processor, a microprocessor, a host processor, a controller, a plurality of processors or controllers, a chip, a microchip, one or more circuits, circuitry, a logic unit, an Integrated Circuit (IC), an Application-Specific IC (ASIC), or any other suitable multi-purpose or specific processor or controller. For example, processor 124 may execute instructions, for example, of an Operating System (OS) of UE 102 and/or of one or more suitable applications.

In some demonstrative embodiments, input unit 116 may include, for example, a keyboard, a keypad, a mouse, a touch-screen, a touch-pad, a track-ball, a stylus, a microphone, or other suitable pointing device or input device.

Output unit 118 may include, for example, a screen, a touch-screen, a flat panel display, a Liquid Crystal Display (LCD) display unit, a plasma display unit, one or more audio speakers or earphones, or other suitable output devices.

In some demonstrative embodiments, memory unit 120 may include, for example, a Random Access Memory (RAM), a Read Only Memory (ROM), a Dynamic RAM (DRAM), a Synchronous DRAM (SD-RAM), a flash memory, a volatile memory, a non-volatile memory, a cache memory, a buffer, a short term memory unit, a long term memory unit, or other suitable memory units. Storage unit 122 may include, for example, a storage drive, a storage card, and/or other suitable removable or non-removable storage units. Memory unit 120 and/or storage unit 122, for example, may store data processed by UE 102.

Figure 2:
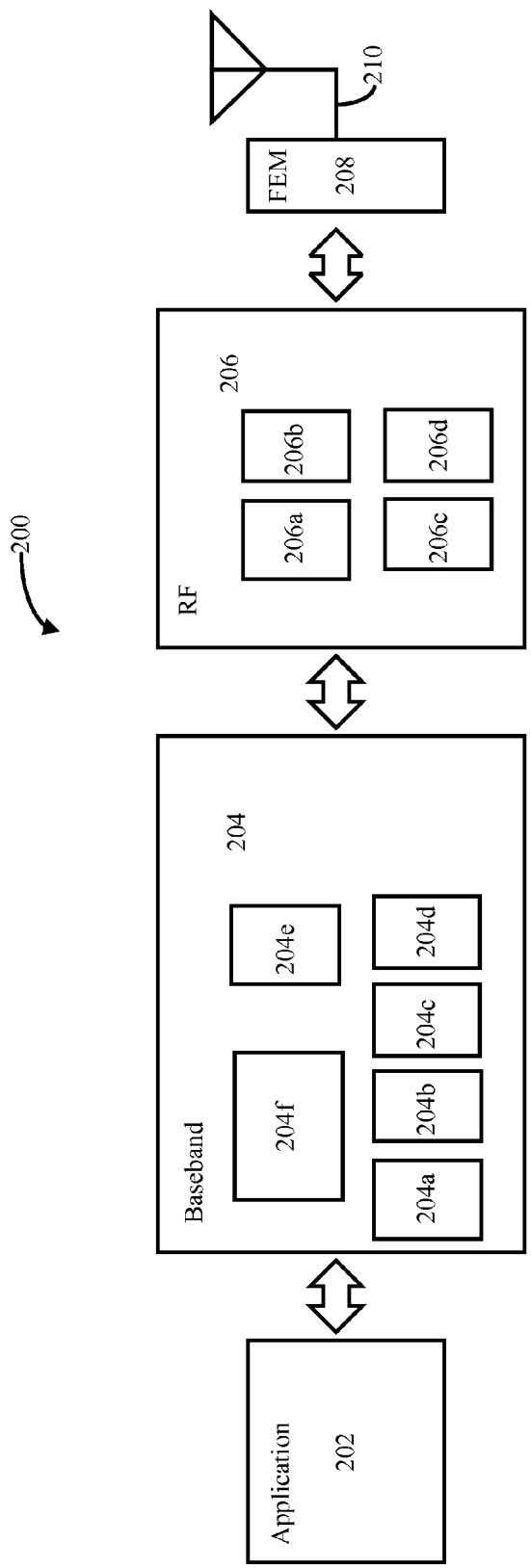
FIG. 2 is a schematic illustration of elements of a User Equipment (UE), in accordance with some demonstrative embodiments.

Reference is made to FIG. 2, which schematically illustrates elements of a UE device 200, in accordance with some demonstrative embodiments. For example, one or more elements of UE device 200 may perform the functionality of one or more elements of UE 102 (FIG. 1). In one example, one or more elements of UE device 200 may be configured to perform the functionality of one or more of cellular TRx 146 (FIG. 1), WLAN TRx 147 (FIG. 1), communication module 192 (FIG. 1), API 194 (FIG. 1), NAS module 196 (FIG. 1, data plane manager 198 (FIG. 1), memory 193 (FIG. 1), and/or one or more other elements of UE 102 (FIG. 1). In some demonstrative embodiments, embodiments of a UE may be implemented into a system using any suitably configured hardware and/or software. FIG. 2 illustrates, for one embodiment, example components of UE device 200.

In some demonstrative embodiments, UE device 200 may include application circuitry 202, baseband circuitry 204, Radio Frequency (RF) circuitry 206, front-end module (FEM) circuitry 208, and one or more antennas 210, coupled together at least as shown.

In one example, application circuitry 202 may be configured to perform at least part of the functionality of communication module 192 (FIG. 1), API 194 (FIG. 1), NAS module 196 (FIG. 1), and/or data plane manager 198 (FIG. 1); and/or baseband circuitry 204, RF circuitry 206, and/or FEM circuitry 208 may be configured to perform at least part of the functionality of TRx 146 (FIG. 1), WLAN TRx 147 (FIG. 1), and/or communication module 192 (FIG. 1).

In some demonstrative embodiments, the application circuitry 202 may include one or more application processors. For example, the application circuitry 202 may include circuitry such as, but not limited to, one or more single-core or multi-core processors. The processor(s) may include any combination of general-purpose processors and dedicated processors (e.g., graphics processors, application processors, etc.). The processors may be coupled with and/or may include memory/storage and may be configured to execute instructions stored in the memory/storage to enable various applications and/or operating systems to run on the system.

In some demonstrative embodiments, the baseband circuitry 204 may include circuitry such as, but not limited to, one or more single-core or multi-core processors. The baseband circuitry 204 may include one or more baseband processors and/or control logic to process baseband signals received from a receive signal path of the RF circuitry 206 and to generate baseband signals for a transmit signal path of the RF circuitry 206. Baseband processing circuitry 204 may interface with the application circuitry 202, for example, for generation and processing of the baseband signals and for controlling operations of the RF circuitry 206. For example, in some embodiments, the baseband circuitry 204 may include a second generation (2G) baseband processor 204a, a third generation (3G) baseband processor 204b, a fourth generation (4G) baseband processor 204c, and/or other baseband processor(s) 204d for other existing generations, generations in development or to be developed in the future (e.g., fifth generation (5G), 6G, etc.). The baseband circuitry 204 (e.g., one or more of baseband processors 204a-d) may handle various radio control functions that enable communication with one or more radio networks via the RF circuitry 206. The radio control functions may include, but are not limited to, signal modulation/demodulation, encoding/decoding, radio frequency shifting, etc. In some embodiments, modulation/demodulation circuitry of the baseband circuitry 204 may include Fast-Fourier Transform (FFT), precoding, and/or constellation mapping/demapping functionality. In some embodiments, encoding/decoding circuitry of the baseband circuitry 204 may include convolution, tail-biting convolution, turbo, Viterbi, and/or Low Density Parity Check (LDPC) encoder/decoder functionality. Embodiments of modulation/demodulation and encoder/decoder functionality are not limited to these examples and may include other suitable functionality in other embodiments.

In some demonstrative embodiments, the baseband circuitry 204 may include elements of a protocol stack such as, for example, elements of an evolved universal terrestrial radio access network (EUTRAN) protocol including, for example, physical (PHY), media access control (MAC), radio link control (RLC), packet data convergence protocol (PDCP), and/or radio resource control (RRC) elements. A central processing unit (CPU) 204e of the baseband circuitry 204 may be configured, for example, to run elements of the protocol stack for signaling of the PHY, MAC, RLC, PDCP and/or RRC layers. In some embodiments, the baseband circuitry may include one or more audio digital signal processor(s) (DSP) 204f. The audio DSP(s) 204f may be include elements for compression/decompression and echo cancellation, and/or may include other suitable processing elements in other embodiments. Components of the baseband circuitry 204 may be suitably combined in a single chip, a single chipset, or disposed on a same circuit board in some embodiments. In some embodiments, some or all of the constituent components of the baseband circuitry 204 and the application circuitry 202 may be implemented together such as, for example, on a system on a chip (SOC).

In some demonstrative embodiments, the baseband circuitry 204 may provide for communication compatible with one or more radio technologies. For example, in some embodiments, the baseband circuitry 204 may support communication with an evolved universal terrestrial radio access network (EUTRAN) and/or other wireless metropolitan area networks (WMAN), a wireless local area network (WLAN), a wireless personal area network (WPAN), and/or one or more additional or alternative networks. Embodiments in which the baseband circuitry 204 is configured to support radio communications of more than one wireless protocol may be referred to as multi-mode baseband circuitry.

In some demonstrative embodiments, RF circuitry 206 may enable communication with wireless networks using modulated electromagnetic radiation through a non-solid medium. In various embodiments, the RF circuitry 206 may include switches, filters, amplifiers, etc. to facilitate the communication with the wireless network. RF circuitry 206 may include a receive signal path which may include circuitry to down-convert RF signals received from the FEM circuitry 208, and to provide baseband signals to the baseband circuitry 204. RF circuitry 206 may also include a transmit signal path which may include circuitry to up-convert baseband signals provided by the baseband circuitry 204 and provide RF output signals to the FEM circuitry 208 for transmission.

In some demonstrative embodiments, the RF circuitry 206 may include a receive signal path and a transmit signal path. The receive signal path of the RF circuitry 206 may include mixer circuitry 206a, amplifier circuitry 206b, and filter circuitry 206c. The transmit signal path of the RF circuitry 206 may include filter circuitry 206c and mixer circuitry 206a. RF circuitry 206 may also include synthesizer circuitry 206d for synthesizing a frequency for use by the mixer circuitry 206a of the receive signal path and the transmit signal path. In some embodiments, the mixer circuitry 206a of the receive signal path may be configured to down-convert RF signals received from the FEM circuitry 208 based on the synthesized frequency provided by synthesizer circuitry 206d. The amplifier circuitry 206b may be configured to amplify the down-converted signals and the filter circuitry 206c may be, for example, a low-pass filter (LPF) or a band-pass filter (BPF), configured to remove unwanted signals from the down-converted signals to generate output baseband signals. Output baseband signals may be provided to the baseband circuitry 204 for further processing. In some embodiments, the output baseband signals may be zero-frequency baseband signals, although this is not a requirement. In some embodiments, mixer circuitry 206a of the receive signal path may comprise passive mixers, although the scope of the embodiments is not limited in this respect.

In some demonstrative embodiments, the mixer circuitry 206a of the transmit signal path may be configured to up-convert input baseband signals based on the synthesized frequency provided by the synthesizer circuitry 206d to generate RF output signals for the FEM circuitry 208. The baseband signals may be provided by the baseband circuitry 204 and may be filtered by filter circuitry 206c. The filter circuitry 206c may include a low-pass filter (LPF), although the scope of the embodiments is not limited in this respect.

In some demonstrative embodiments, the mixer circuitry 206a of the receive signal path and the mixer circuitry 206a of the transmit signal path may include two or more mixers and may be arranged for quadrature downconversion and/or upconversion respectively. In some embodiments, the mixer circuitry 206a of the receive signal path and the mixer circuitry 206a of the transmit signal path may include two or more mixers and may be arranged for image rejection (e.g., Hartley image rejection). In some embodiments, the mixer circuitry 206a of the receive signal path and the mixer circuitry 206a may be arranged for direct downconversion and/or direct upconversion, respectively. In some embodiments, the mixer circuitry 206a of the receive signal path and the mixer circuitry 206a of the transmit signal path may be configured for super-heterodyne operation.

In some demonstrative embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 206 may include analog-to-digital converter (ADC) and digital-to-analog converter (DAC) circuitry, and the baseband circuitry 204 may include a digital baseband interface to communicate with the RF circuitry 206.

In some dual-mode embodiments, a separate radio IC circuitry may be provided for processing signals for each spectrum, although the scope of the embodiments is not limited in this respect.

In some demonstrative embodiments, the synthesizer circuitry 206d may be a fractional-N synthesizer or a fractional N/N+1 synthesizer, although the scope of the embodiments is not limited in this respect as other types of frequency synthesizers may be suitable. For example, synthesizer circuitry 206d may be a delta-sigma synthesizer, a frequency multiplier, or a synthesizer comprising a phase-locked loop with a frequency divider.

In some demonstrative embodiments, the synthesizer circuitry 206d may be configured to synthesize an output frequency for use by the mixer circuitry 206a of the RF circuitry 206 based on a frequency input and a divider control input. In some embodiments, the synthesizer circuitry 206d may be a fractional N/N+1 synthesizer.

In some demonstrative embodiments, frequency input may be provided by a voltage controlled oscillator (VCO), although that is not a requirement. Divider control input may be provided by either the baseband circuitry 204 or the applications processor 202 depending on the desired output frequency. In some embodiments, a divider control input (e.g., N) may be determined from a look-up table based on a channel indicated by the applications processor 202.

In some demonstrative embodiments, synthesizer circuitry 206d of the RF circuitry 206 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some demonstrative embodiments, synthesizer circuitry 206d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 206 may include an IQ/polar converter.

In some demonstrative embodiments, FEM circuitry 208 may include a receive signal path which may include circuitry configured to operate on RF signals received from one or more antennas 210, amplify the received signals and provide the amplified versions of the received signals to the RF circuitry 206 for further processing. FEM circuitry 208 may also include a transmit signal path which may include circuitry configured to amplify signals for transmission provided by the RF circuitry 206 for transmission by one or more of the one or more antennas 210.

In some demonstrative embodiments, the FEM circuitry 208 may include a TX/RX switch to switch between transmit mode and receive mode operation. The FEM circuitry may include a receive signal path and a transmit signal path. The receive signal path of the FEM circuitry may include a low-noise amplifier (LNA) to amplify received RF signals and provide the amplified received RF signals as an output (e.g., to the RF circuitry 206). The transmit signal path of the FEM circuitry 208 may include a power amplifier (PA) to amplify input RF signals (e.g., provided by RF circuitry 206), and one or more filters to generate RF signals for subsequent transmission (e.g., by one or more of the one or more antennas 210.

In some embodiments, the UE device 200 may include one or more additional or alternative elements such as, for example, memory/storage, display, camera, sensor, and/or input/output (I/O) interface.

Figure 3:
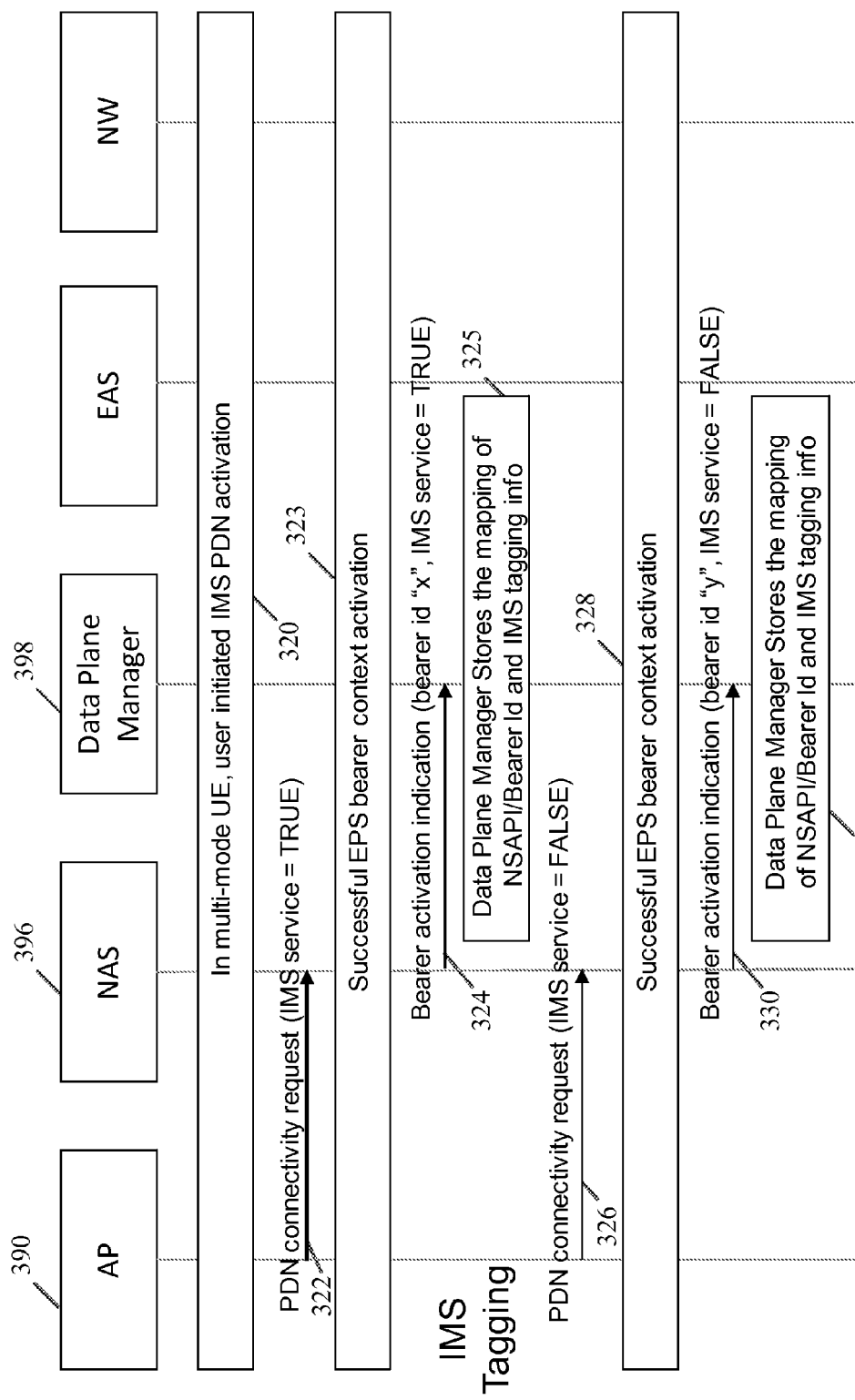
FIG. 3 is a sequence diagram of operations and interactions between elements of a UE to assign an Internet Protocol (IP) Multimedia Subsystem (IMS) tag to an identifier of a connection, in accordance with some demonstrative embodiments.

FIG. 3 is a sequence diagram of operations and interactions between elements of a UE to assign an Internet Protocol (IP) Multimedia Subsystem (IMS) tag to an identifier of a connection, in accordance with some demonstrative embodiments. For example, the UE may include a multi-mode UE supporting a plurality of RATs, e.g., enabling communication over an IMS connection and a non-IMS connection. For example, one or more of the operations of FIG. 3 may be performed by one or more elements of UE 102 (FIG. 1).

In some demonstrative embodiments, as shown in FIG. 3, a user of at least one application executed by the UE may initiate an activation of an IMS PDN connection 320. For example, the at least one application may perform the functionality of application 190 (FIG. 1).

In some demonstrative embodiments, as shown in FIG. 3, an application (APP) layer 390 of the UE may send to a NAS module 396 of the UE a PDN connectivity request 322 including an indication, e.g., "IMS service=true", that the PDN connection is to be activated for an IMS service. For example, NAS module 396 may perform the functionality of NAS module 196 (FIG. 1).

In some demonstrative embodiments, as shown in FIG. 3, an EPS bearer context may be activated (323) for the IMS service.

In some demonstrative embodiments, as shown in FIG. 3, NAS module 396 may send to a data plane manager 398 of the UE a bearer activation indication 324, which may include an identifier of the EPS bearer, e.g., "bearer id "x"", and an indication, e.g., "IMS service=true", that the PDN connection is to be activated for an IMS service. For example, data plane manager 398 may perform the functionality of data plane manager 198 (FIG. 1).

In some demonstrative embodiments, as shown in FIG. 3, data plane manager 398 may store mapping information 325 to map the bearer identifier of the bearer to IMS tagging information, which may tag the bearer identifier as an IMS bearer.

In some demonstrative embodiments, as shown in FIG. 3, the user of the at least one application layer 390 may initiate an activation of a non-IMS PDN connection. For example, application layer 390 may send to NAS module 396 a PDN connectivity request 326 including an indication, e.g., "IMS service=false", that the PDN connection is to be activated for a non-IMS service.

In some demonstrative embodiments, as shown in FIG. 3, an EPS bearer context may be activated (328) for the non-IMS service.

In some demonstrative embodiments, as shown in FIG. 3, NAS module 396 may send to data plane manager 398 a bearer activation indication 330, which may include an identifier of the EPS bearer, e.g., "bearer id "y"", and an indication, e.g., "IMS service=false", that the PDN connection is to be activated for a non-IMS service.

In some demonstrative embodiments, as shown in FIG. 3, data plane manager 398 may store mapping information 332 to map the bearer identifier of the bearer to IMS tagging information, which may tag the bearer identifier as a non-IMS bearer.

Figure 4:
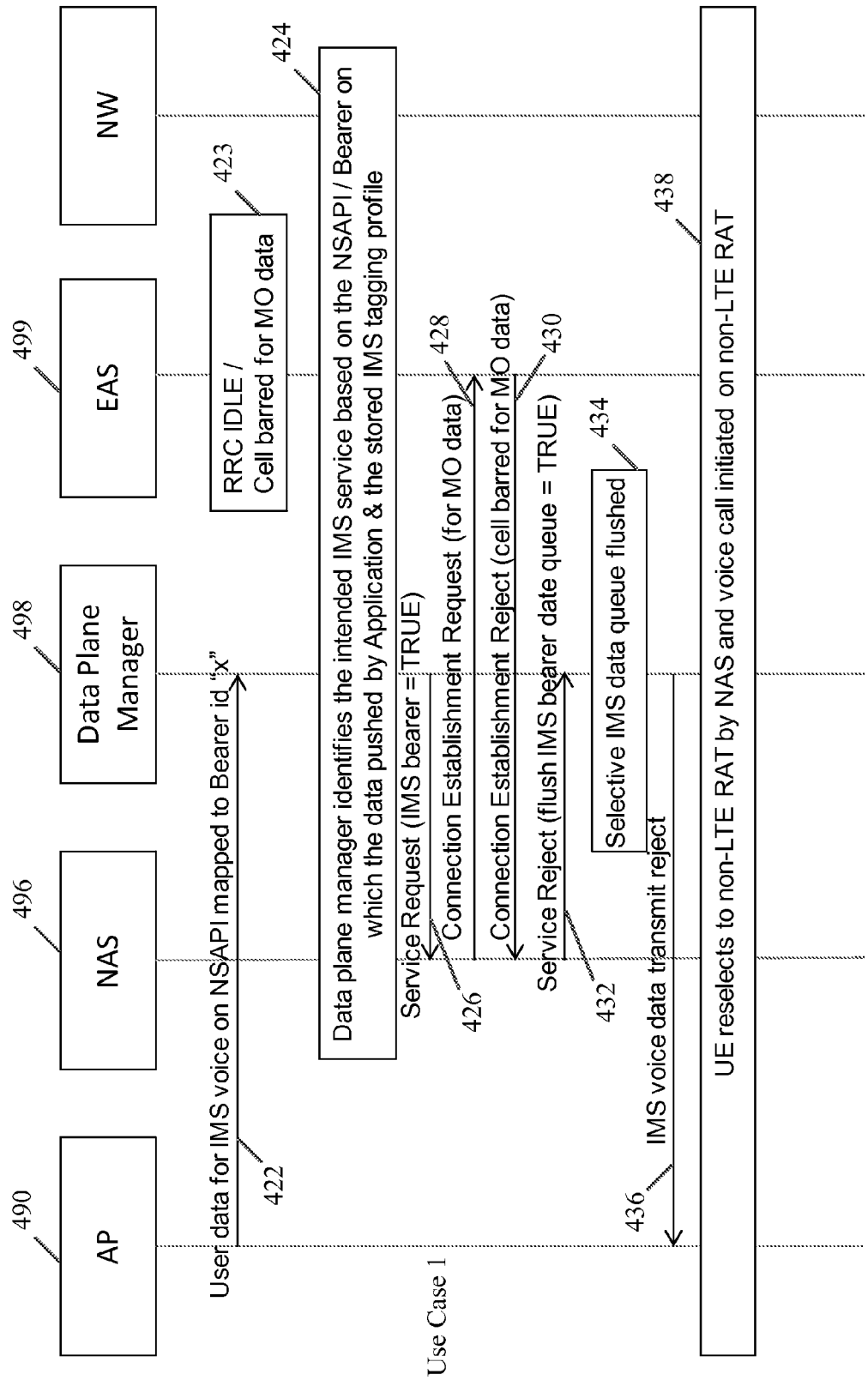
FIG. 4 is a sequence diagram of operations and interactions between elements of a UE to process a request to handle packets of a connection according to an IMS tag assigned to an identifier of the connection, in accordance with some demonstrative embodiments.

FIG. 4 is a sequence diagram of operations and interactions between elements of a UE to process a request to handle packets of a connection according to an IMS tag assigned to an identifier of the connection, in accordance with some demonstrative embodiments. For example, the UE may include a multi-mode UE supporting a plurality of RATs, e.g., enabling communication over an IMS connection and a non-IMS connection. For example, one or more of the operations of FIG. 4 may be performed by one or more elements of UE 102 (FIG. 1).

In some demonstrative embodiments, one or more operations of the FIG. 4 may be performed based on the mapping information and/or the IMS tagging information, which may be generated, for example, based on the operation described above with reference to FIG. 3.

In some demonstrative embodiments, one or more operations of the FIG. 4 may be performed with respect to the Case 1, e.g., as described above.

In some demonstrative embodiments, as shown in FIG. 4, an application (APP) layer 490 of the UE may send to a data plane manager 498 of the UE user data 422 to be communicated on a NSAPI mapped to the bearer id "x". For example, the user data may include data packets of an IMS voice service. For example, data plane manager 498 may perform the functionality of data plane manager 198 (FIG. 1).

In some demonstrative embodiments, as shown in FIG. 4, the cell may be barred (423) for a Mobile Originated (MO) data call, and/or the UE may be in an idle Radio Resource Control (RRC) state.

In some demonstrative embodiments, as shown in FIG. 4, data plane manager 498 may identify that the user data 422 corresponds to an IMS service, for example, based on the IMS tagging information corresponding to the bearer identifier to which the user data 422 is mapped, e.g., as described above.

In some demonstrative embodiments, as shown in FIG. 4, data plane manager 498 send to a NAS module 496 of the UE a service request 426 including an indication, e.g., "IMS bearer=true", that service is requested with respect to an IMS bearer.

In some demonstrative embodiments, as shown in FIG. 4, NAT module 496 may send to an E-UTRAN Access Stratum (EAS) module 499 of the UE a connection establishment request 428 for the MO data.

In some demonstrative embodiments, as shown in FIG. 4, EAS module 499 may send to NAS module 496 a connection establishment reject message 430 indicating that the cell is barred for MO data.

In some demonstrative embodiments, as shown in FIG. 4, NAS module 496 may send to data plane manager 498 a service reject message 432 including an indication, e.g., "flush IMS bearer data queue=True", to flush all data packets of the IMS bearer.

In some demonstrative embodiments, as shown in FIG. 4, data plane manager 498 may selectively flush the IMS data queue, e.g., without flushing a non-IMS data queues, for example, by flushing all buffered data packets having a bearer id mapped to an IMS tag indicating an IMS connection, e.g., as described above.

In some demonstrative embodiments, as shown in FIG. 4, data plane manager 498 may send a reject message 436 to application layer 490, e.g., to indicate that the request to transmit the IMS data 422 is rejected.

In some demonstrative embodiments, as shown in FIG. 4, the UE may reselect (438) another RAT, e.g., a non-LTE RAT, and a voice call may be initiated on the new RAT, e.g., to setup a CS voice call on the new RAT.

Figure 5:
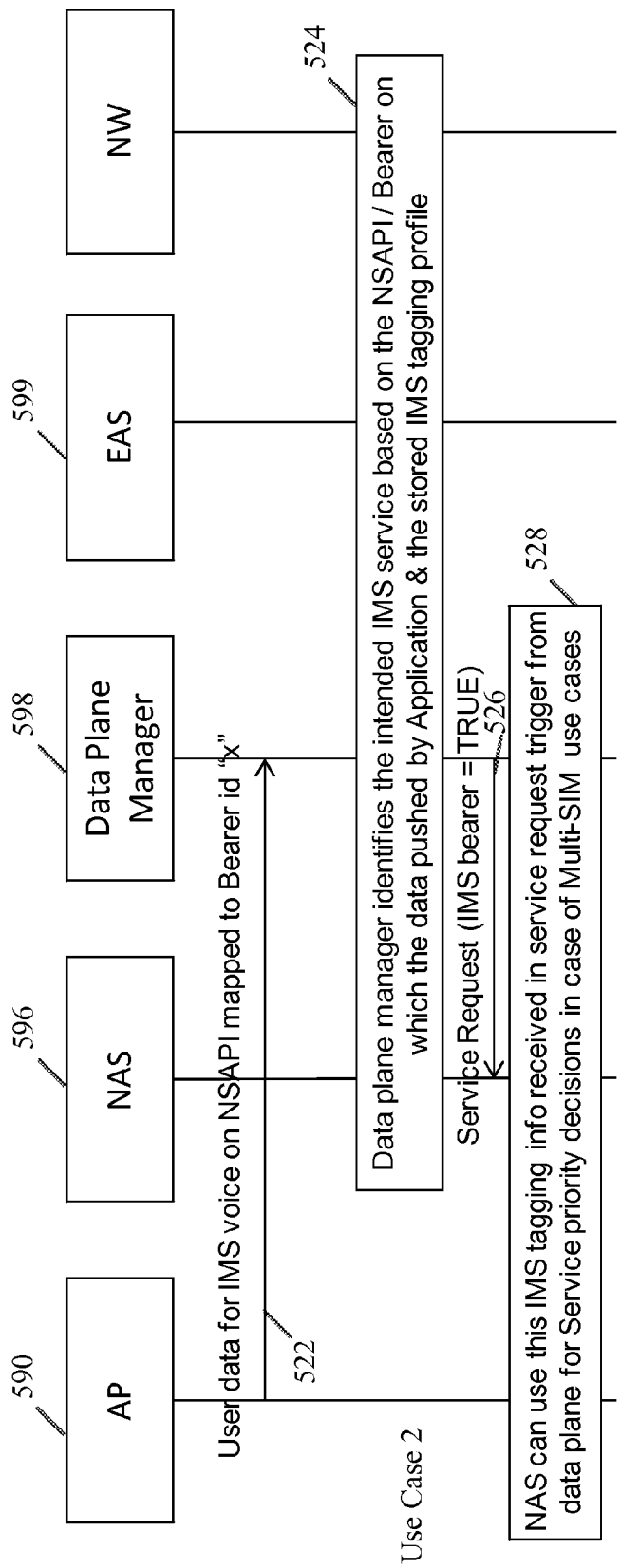
FIG. 5 is a sequence diagram of operations and interactions between elements of a UE to process a request to handle packets of a connection according to an IMS tag assigned to an identifier of the connection, in accordance with some demonstrative embodiments.

FIG. 5 is a sequence diagram of operations and interactions between elements of a UE to process a request to handle packets of a connection according to an IMS tag assigned to an identifier of the connection, in accordance with some demonstrative embodiments. For example, the UE may include a multi-mode UE supporting a plurality of RATs, e.g., enabling communication over an IMS connection and a non-IMS connection. For example, one or more of the operations of FIG. 5 may be performed by one or more elements of UE 102 (FIG. 1).

In some demonstrative embodiments, one or more operations of the FIG. 5 may be performed based on the mapping information and/or the IMS tagging information, which may be generated, for example, based on the operation described above with reference to FIG. 3.

In some demonstrative embodiments, one or more operations of the FIG. 5 may be performed to prioritize packet transmission, for example, with respect to the Case 2, e.g., as described above.

In some demonstrative embodiments, as shown in FIG. 5, an application (APP) layer 590 of the UE may send to a data plane manager 598 of the UE user data 522 to be communicated on a NSAPI mapped to the bearer id "x". For example, the user data may include data packets of an IMS voice service. For example, data plane manager 598 may perform the functionality of data plane manager 198 (FIG. 1).

In some demonstrative embodiments, as shown in FIG. 5, data plane manager 598 may identify that the user data 522 corresponds to an IMS service, for example, based on the IMS tagging information corresponding to the bearer identifier to which the user data 522 is mapped, e.g., as described above.

In some demonstrative embodiments, as shown in FIG. 5, data plane manager 598 send to a NAS module 596 of the UE a service request 526 including an indication, e.g., "IMS bearer=true", that service is requested with respect to an IMS bearer.

In some demonstrative embodiments, as shown in FIG. 5, NAS module 596 may prioritize (528) transmission of packets based on the IMS bearer information provided by data plane manager 498. For example, NAS module 596 may prioritize transmission of packets having a bearer ID mapped to IMS tagging information indicating an IMS connection, e.g., as described above.

Figure 6:
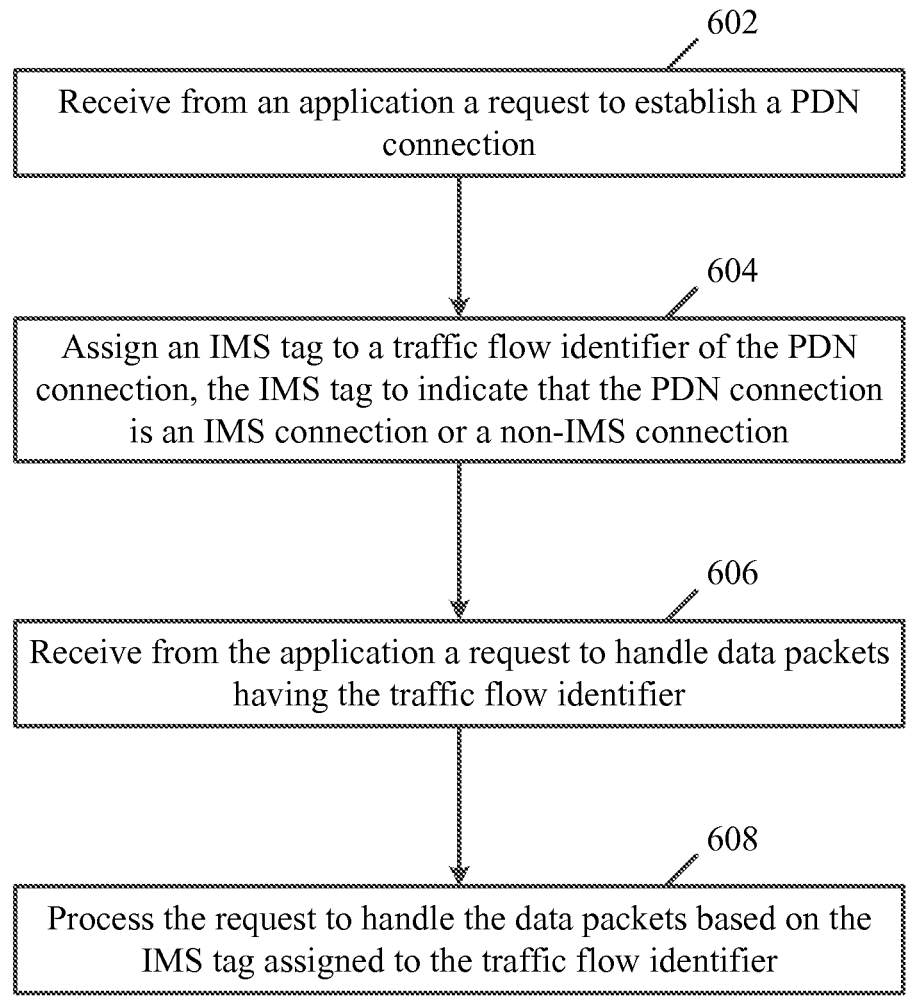
FIG. 6 is a schematic flow-chart illustration of a method of differentiating between an IMS connection and a non-IMS connection, in accordance with some demonstrative embodiments.

FIG. 6 is a schematic flow-chart illustration of a method of differentiating between an IMS connection and a non-IMS connection, in accordance with some demonstrative embodiments. In some embodiments, one or more of the operations of the method of FIG. 6 may be performed by a wireless communication system, e.g., system 100 (FIG. 1); a UE, e.g., UE 102 (FIG. 1); a communication module, e.g., communication module 192 (FIG. 1); a NAS module, e.g., NAS module 196 (FIG. 1), NAS module 396 (FIG. 3), NAS module 496 (FIG. 4), and/or NAS module 596 (FIG. 5); and/or a data plane manager, e.g., data plane manager 198 (FIG. 1), data plane manager 398 (FIG. 3), data plane manager 498 (FIG. 4), and/or data plane manager 598 (FIG. 5).

As indicated at block 602, the method may include receiving from an application a request to establish a PDN connection. For example, communication module 192 (FIG. 1) may receive a request to establish a PDN connection from application 190 (FIG. 1), for example, via API 194 (FIG. 1), e.g., as described above.

As indicated at block 604, the method may include assigning an IMS tag to a traffic flow identifier of the PDN connection, the IMS tag to indicate that the PDN connection is an IMS connection or a non-IMS connection. For example, data plane manager 198 (FIG. 1) may store an IMS tag mapped to the traffic flow identifier of the PDN connection, e.g., as described above.

As indicated at block 606, the method may include receiving from the application a request to handle data packets having the traffic flow identifier. For example, data plane manager 198 (FIG. 1) may receive a request from application 190 (FIG. 1) to handle the data packets, e.g., as described above.

As indicated at block 608, the method may include processing the request to handle the data packets based on the IMS tag assigned to the traffic flow identifier. For example, data plane manager 198 (FIG. 1) and/or NAS module 196 (FIG. 1) may process the request to handle the data packets based on the IMS tag assigned to the traffic flow identifier, e.g., as described above.

Figure 7:
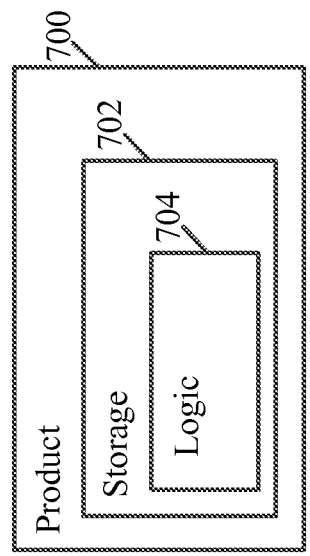
FIG. 7 is a schematic illustration of a product, in accordance with some demonstrative embodiments.

Reference is made to FIG. 7, which schematically illustrates a product of manufacture 700, in accordance with some demonstrative embodiments. Product 700 may include a non-transitory machine-readable storage medium 702 to store logic 704, which may be used, for example, to perform at least part of the functionality of UE 102 (FIG. 1), communication module 192 (FIG. 1), NAS module 196 (FIG. 1), NAS module 396 (FIG. 3), NAS module 496 (FIG. 4), NAS module 596 (FIG. 5), data plane manager 198 (FIG. 1), data plane manager 398 (FIG. 3), data plane manager 498 (FIG. 4), and/or data plane manager 598 (FIG. 5), and/or to perform one or more operations described herein, e.g., with respect to FIGS. 3, 4, 5, and/or 6. The phrase "non-transitory machine-readable medium" is directed to include all computer-readable media, with the sole exception being a transitory propagating signal.

In some demonstrative embodiments, product 700 and/or machine-readable storage medium 702 may include one or more types of computer-readable storage media capable of storing data, including volatile memory, non-volatile memory, removable or non-removable memory, erasable or non-erasable memory, writeable or re-writeable memory, and the like. For example, machine-readable storage medium 702 may include, RAM, DRAM, Double-Data-Rate DRAM (DDR-DRAM), SDRAM, static RAM (SRAM), ROM, programmable ROM (PROM), erasable programmable ROM (EPROM), electrically erasable programmable ROM (EEPROM), Compact Disk ROM (CD-ROM), Compact Disk Recordable (CD-R), Compact Disk Rewriteable (CD-RW), flash memory (e.g., NOR or NAND flash memory), content addressable memory (CAM), polymer memory, phase-change memory, ferroelectric memory, silicon-oxide-nitride-oxide-silicon (SONOS) memory, a disk, a floppy disk, a hard drive, an optical disk, a magnetic disk, a card, a magnetic card, an optical card, a tape, a cassette, and the like. The computer-readable storage media may include any suitable media involved with downloading or transferring a computer program from a remote computer to a requesting computer carried by data signals embodied in a carrier wave or other propagation medium through a communication link, e.g., a modem, radio or network connection.

In some demonstrative embodiments, logic 704 may include instructions, data, and/or code, which, if executed by a machine, may cause the machine to perform a method, process and/or operations as described herein. The machine may include, for example, any suitable processing platform, computing platform, computing device, processing device, computing system, processing system, computer, processor, or the like, and may be implemented using any suitable combination of hardware, software, firmware, and the like.

In some demonstrative embodiments, logic 704 may include, or may be implemented as, software, a software module, an application, a program, a subroutine, instructions, an instruction set, computing code, words, values, symbols, and the like. The instructions may include any suitable type of code, such as source code, compiled code, interpreted code, executable code, static code, dynamic code, and the like. The instructions may be implemented according to a predefined computer language, manner or syntax, for instructing a processor to perform a certain function. The instructions may be implemented using any suitable high-level, low-level, object-oriented, visual, compiled and/or interpreted programming language, such as C, C++, Java, BASIC, Matlab, Pascal, Visual BASIC, assembly language, machine code, and the like.

EXAMPLES

The following examples pertain to further embodiments.

Example 1 includes an integrated circuit comprising an Application Protocol Interface (API) component configured to receive from an application a request to establish a Packet Data Network (PDN) connection; and a data plane manager component configured to assign an Internet Protocol (IP) Multimedia Subsystem (IMS) tag to a traffic flow identifier of the PDN connection, wherein the IMS tag indicates that the PDN connection is an IMS connection or a non-IMS connection, wherein the data plane manager is further configured to receive from the application a request to handle data packets having the traffic flow identifier, and to process the request to handle the data packets based on the IMS tag assigned to the traffic flow identifier.

Example 2 includes the subject matter of Example 1, and optionally, comprising a Non-Access Stratum (NAS) component module configured to receive the request to establish the PDN connection via the API component, and to provide to the data plane manager component an activation indication comprising the traffic flow identifier and an IMS service indication corresponding to the PDN connection.

Example 3 includes the subject matter of Example 2, and optionally, wherein the data plane manager component is configured to provide to the NAS component module a service request to communicate the data packets, the service request comprising the IMS tag assigned to the traffic flow identifier.

Example 4 includes the subject matter of Example 3, and optionally, wherein the NAS component module is configured to prioritize communication of first data packets over second data packets, based on first and second service requests from the data plane manager component, the first service request corresponding to the first data packets and comprising a first IMS tag indicating the IMS connection, and the second service request corresponding to the second data packets and comprising a second IMS tag indicating the non-IMS connection.

Example 5 includes the subject matter of Example 4, and optionally, wherein the first packets comprise packets from a first Subscriber Identity Module (SIM) having an active IMS service, and the second packets comprise packets from a second SIM with an ongoing data transfer of a non-IMS service.

Example 6 includes the subject matter of any one of Examples 3-5, and optionally, wherein the NAS component module is configured to provide to the data plane manager component a service reject, when the IMS tag indicates the IMS connection, and when a data transfer is switched from the IMS connection to the non-IMS connection.

Example 7 includes the subject matter of Example 6, and optionally, wherein the data plane manager component is configured to, in response to the service reject, delete from a packet queue data packets with a traffic flow identifier, which is assigned to an IMS tag indicating the IMS connection.

Example 8 includes the subject matter of any one of Examples 1-7, and optionally, wherein the data plane manager component is configured to store mapping information configured to map a plurality of traffic flow identifiers to IMS tagging information, the IMS tagging information configured to tag a traffic flow identifier of the plurality of traffic flow identifiers as belonging to either an IMS service or an non-IMS service.

Example 9 includes the subject matter of any one of Examples 1-8, and optionally, wherein the traffic flow identifier comprises an Evolved Packet System (EPS) bearer identifier (ID).

Example 10 includes the subject matter of any one of Examples 1-8, and optionally, wherein the traffic flow identifier comprises Network Service Access Point Identifier (NSAPI).

Example 11 includes a User Equipment (UE) comprising one or more antennas; a cellular transceiver to communicate in a cellular network; and a communication module comprising circuitry and logic configured to receive from an application a request to establish a Packet Data Network (PDN) connection, and to assign an Internet Protocol (IP) Multimedia Subsystem (IMS) tag to a traffic flow identifier of the PDN connection, the IMS tag to indicate that the PDN connection is an IMS connection or a non-IMS connection, the communication module is configured to receive from the application a request to handle data packets having the traffic flow identifier, and to process the request to handle the data packets based on the IMS tag assigned to the traffic flow identifier.

Example 12 includes the subject matter of Example 11, and optionally, wherein the communication module comprises a data plane manager component to process the request to handle the data packets based on the IMS tag assigned to the traffic flow identifier; and a Non-Access Stratum (NAS) component module configured to receive the request to establish the PDN connection, and to provide to the data plane manager component an activation indication comprising the traffic flow identifier and an IMS service indication corresponding to the PDN connection.

Example 13 includes the subject matter of Example 12, and optionally, wherein the data plane manager component is configured to provide to the NAS component module a service request to communicate the data packets, the service request comprising the IMS tag assigned to the traffic flow identifier.

Example 14 includes the subject matter of Example 13, and optionally, wherein the NAS component module is configured to prioritize communication of first data packets over second data packets, based on first and second service requests from the data plane manager component, the first service request corresponding to the first data packets and comprising a first IMS tag indicating the IMS connection, and the second service request corresponding to the second data packets and comprising a second IMS tag indicating the non-IMS connection.

Example 15 includes the subject matter of Example 14, and optionally, wherein the first packets comprise packets from a first Subscriber Identity Module (SIM) having an active IMS service, and the second packets comprise packets from a second SIM with an ongoing data transfer of a non-IMS service.

Example 16 includes the subject matter of any one of Examples 13-15, and optionally, wherein the NAS component module is configured to provide to the data plane manager component a service reject, when the IMS tag indicates the IMS connection, and when a data transfer is switched from the IMS connection to the non-IMS connection.

Example 17 includes the subject matter of Example 16, and optionally, wherein the data plane manager component is configured to, in response to the service reject, delete from a packet queue data packets with a traffic flow identifier, which is assigned to an IMS tag indicating the IMS connection.

Example 18 includes the subject matter of any one of Examples 11-17, and optionally, wherein the communication module is configured to store mapping information configured to map a plurality of traffic flow identifiers to IMS tagging information, the IMS tagging information configured to tag a traffic flow identifier of the plurality of traffic flow identifiers as belonging to either an IMS service or an non-IMS service.

Example 19 includes the subject matter of any one of Examples 11-18, and optionally, wherein the traffic flow identifier comprises an Evolved Packet System (EPS) bearer identifier (ID).

Example 20 includes the subject matter of any one of Examples 11-18, and optionally, wherein the traffic flow identifier comprises Network Service Access Point Identifier (NSAPI).

Example 21 includes a product comprising one or more tangible computer-readable non-transitory storage media comprising computer-executable instructions operable to, when executed by at least one computer processor, enable the at least one computer processor to perform one or more operations at a User Equipment (UE), the operations comprising receiving from an application a request to establish a Packet Data Network (PDN) connection; assigning an Internet Protocol (IP) Multimedia Subsystem (IMS) tag to a traffic flow identifier of the PDN connection, wherein the IMS tag indicates that the PDN connection is an IMS connection or a non-IMS connection; receiving from the application a request to handle data packets having the traffic flow identifier; and processing the request to handle the data packets based on the IMS tag assigned to the traffic flow identifier.

Example 22 includes the subject matter of Example 21, and optionally, wherein the operations comprise receiving the request to establish the PDN connection at a Non Access Stratum (NAS) component module, and providing from the NAS component module to a data plane manager component an activation indication comprising the traffic flow identifier and an IMS service indication corresponding to the PDN connection.

Example 23 includes the subject matter of Example 22, and optionally, wherein the operations comprise providing from the NAS component module to the data plane manager component a service request to communicate the data packets, the service request comprising the IMS tag assigned to the traffic flow identifier.

Example 24 includes the subject matter of Example 23, and optionally, wherein the operations comprise prioritizing communication of first data packets over second data packets, based on first and second service requests, the first service request corresponding to the first data packets and comprising a first IMS tag indicating the IMS connection, and the second service request corresponding to the second data packets and comprising a second IMS tag indicating the non-IMS connection.

Example 25 includes the subject matter of Example 24, and optionally, wherein the first packets comprise packets from a first Subscriber Identity Module (SIM) having an active IMS service, and the second packets comprise packets from a second SIM with an ongoing data transfer of a non-IMS service.

Example 26 includes the subject matter of any one of Examples 23-25, and optionally, wherein the operations comprise providing from the NAS component module to the data plane manager component a service reject, when the IMS tag indicates the IMS connection, and when a data transfer is switched from the IMS connection to the non-IMS connection.

Example 27 includes the subject matter of Example 26, and optionally, wherein the operations comprise, in response to the service reject, deleting from a packet queue data packets with a traffic flow identifier, which is assigned to an IMS tag indicating the IMS connection.

Example 28 includes the subject matter of any one of Examples 21-27, and optionally, wherein the operations comprise storing mapping information configured to map a plurality of traffic flow identifiers to IMS tagging information, the IMS tagging information configured to tag a traffic flow identifier of the plurality of traffic flow identifiers as belonging to either an IMS service or an non-IMS service.

Example 29 includes the subject matter of any one of Examples 21-28, and optionally, wherein the traffic flow identifier comprises an Evolved Packet System (EPS) bearer identifier (ID).

Example 30 includes the subject matter of any one of Examples 21-28, and optionally, wherein the traffic flow identifier comprises Network Service Access Point Identifier (NSAPI).

Example 31 includes a method to be performed by a User Equipment (UE), the method comprising receiving from an application a request to establish a Packet Data Network (PDN) connection; assigning an Internet Protocol (IP) Multimedia Subsystem (IMS) tag to a traffic flow identifier of the PDN connection, wherein the IMS tag indicates that the PDN connection is an IMS connection or a non-IMS connection; receiving from the application a request to handle data packets having the traffic flow identifier; and processing the request to handle the data packets based on the IMS tag assigned to the traffic flow identifier.

Example 32 includes the subject matter of Example 31, and optionally, comprising receiving the request to establish the PDN connection at a Non Access Stratum (NAS) component module, and providing from the NAS component module to a data plane manager component an activation indication comprising the traffic flow identifier and an IMS service indication corresponding to the PDN connection.

Example 33 includes the subject matter of Example 32, and optionally, comprising providing from the NAS component module to the data plane manager component a service request to communicate the data packets, the service request comprising the IMS tag assigned to the traffic flow identifier.

Example 34 includes the subject matter of Example 33, and optionally, comprising prioritizing communication of first data packets over second data packets, based on first and second service requests, the first service request corresponding to the first data packets and comprising a first IMS tag indicating the IMS connection, and the second service request corresponding to the second data packets and comprising a second IMS tag indicating the non-IMS connection.

Example 35 includes the subject matter of Example 34, and optionally, wherein the first packets comprise packets from a first Subscriber Identity Module (SIM) having an active IMS service, and the second packets comprise packets from a second SIM with an ongoing data transfer of a non-IMS service.

Example 36 includes the subject matter of any one of Examples 33-35, and optionally, comprising providing from the NAS component module to the data plane manager component a service reject, when the IMS tag indicates the IMS connection, and when a data transfer is switched from the IMS connection to the non-IMS connection.

Example 37 includes the subject matter of Example 36, and optionally, comprising, in response to the service reject, deleting from a packet queue data packets with a traffic flow identifier, which is assigned to an IMS tag indicating the IMS connection.

Example 38 includes the subject matter of any one of Examples 31-37, and optionally, comprising storing mapping information configured to map a plurality of traffic flow identifiers to IMS tagging information, the IMS tagging information configured to tag a traffic flow identifier of the plurality of traffic flow identifiers as belonging to either an IMS service or an non-IMS service.

Example 39 includes the subject matter of any one of Examples 31-38, and optionally, wherein the traffic flow identifier comprises an Evolved Packet System (EPS) bearer identifier (ID).

Example 40 includes the subject matter of any one of Examples 31-38, and optionally, wherein the traffic flow identifier comprises Network Service Access Point Identifier (NSAPI).

Example 41 includes an apparatus of cellular communication by a User Equipment (UE), the apparatus comprising means for receiving from an application a request to establish a Packet Data Network (PDN) connection; means for assigning an Internet Protocol (IP) Multimedia Subsystem (IMS) tag to a traffic flow identifier of the PDN connection, wherein the IMS tag indicates that the PDN connection is an IMS connection or a non-IMS connection; means for receiving from the application a request to handle data packets having the traffic flow identifier; and means for processing the request to handle the data packets based on the IMS tag assigned to the traffic flow identifier.

Example 42 includes the subject matter of Example 41, and optionally, comprising means for receiving the request to establish the PDN connection at a Non Access Stratum (NAS) component module, and providing from the NAS component module to a data plane manager component an activation indication comprising the traffic flow identifier and an IMS service indication corresponding to the PDN connection.

Example 43 includes the subject matter of Example 42, and optionally, comprising means for providing from the NAS component module to the data plane manager component a service request to communicate the data packets, the service request comprising the IMS tag assigned to the traffic flow identifier.

Example 44 includes the subject matter of Example 43, and optionally, comprising means for prioritizing communication of first data packets over second data packets, based on first and second service requests, the first service request corresponding to the first data packets and comprising a first IMS tag indicating the IMS connection, and the second service request corresponding to the second data packets and comprising a second IMS tag indicating the non-IMS connection.

Example 45 includes the subject matter of Example 44, and optionally, wherein the first packets comprise packets from a first Subscriber Identity Module (SIM) having an active IMS service, and the second packets comprise packets from a second SIM with an ongoing data transfer of a non-IMS service.

Example 46 includes the subject matter of any one of Examples 43-45, and optionally, comprising means for providing from the NAS component module to the data plane manager component a service reject, when the IMS tag indicates the IMS connection, and when a data transfer is switched from the IMS connection to the non-IMS connection.

Example 47 includes the subject matter of Example 46, and optionally, comprising means for, in response to the service reject, deleting from a packet queue data packets with a traffic flow identifier, which is assigned to an IMS tag indicating the IMS connection.

Example 48 includes the subject matter of any one of Examples 41-47, and optionally, comprising means for storing mapping information configured to map a plurality of traffic flow identifiers to IMS tagging information, the IMS tagging information configured to tag a traffic flow identifier of the plurality of traffic flow identifiers as belonging to either an IMS service or an non-IMS service.

Example 49 includes the subject matter of any one of Examples 41-48, and optionally, wherein the traffic flow identifier comprises an Evolved Packet System (EPS) bearer identifier (ID).

Example 50 includes the subject matter of any one of Examples 41-48, and optionally, wherein the traffic flow identifier comprises Network Service Access Point Identifier (NSAPI).

Functions, operations, components and/or features described herein with reference to one or more embodiments, may be combined with, or may be utilized in combination with, one or more other functions, operations, components and/or features described herein with reference to one or more other embodiments, or vice versa.

While certain features have been illustrated and described herein, many modifications, substitutions, changes, and equivalents may occur to those skilled in the art. It is, therefore, to be understood that the appended claims are intended to cover all such modifications and changes as fall within the true spirit of the disclosure.

What is claimed is:

1. An integrated circuit of a User Equipment (UE) comprising:
   an Application Protocol Interface (API) component configured to receive from an application a request to establish a Packet Data Network (PDN) connection; and
   a data plane manager component configured to store mapping information configured to map a plurality of traffic flow identifiers to Internet Protocol (IP) Multimedia Subsystem (IMS) tagging information, the IMS tagging information configured to tag a traffic flow identifier of the plurality of traffic flow identifiers as belonging to either an IMS service or a non-IMS service, the data plane manager component is configured to assign an IMS tag to a traffic flow identifier of the PDN connection, wherein the IMS tag indicates that the PDN connection is an IMS connection or a non-IMS connection, wherein the data plane manager component is further configured to receive from the application a request to handle data packets having the traffic flow identifier of the PDN connection, and to process the request to handle the data packets based on the IMS tag assigned to the traffic flow identifier of the PDN connection.

2. The integrated circuit of claim 1 further comprising:
a Non-Access Stratum (NAS) component configured to receive the request to establish the PDN connection via the API component, and to provide to the data plane manager component an activation indication comprising the traffic flow identifier of the PDN connection and an IMS service indication corresponding to the PDN connection.

3. The integrated circuit of claim 2, wherein the data plane manager component is configured to provide to the NAS component a service request to communicate the data packets, the service request comprising the IMS tag assigned to the traffic flow identifier of the PDN connection.

4. The integrated circuit of claim 3, wherein the NAS component is configured to prioritize communication of first data packets over second data packets, based on first and second service requests from the data plane manager component, the first service request corresponding to the first data packets and comprising a first IMS tag indicating the IMS connection, and the second service request corresponding to the second data packets and comprising a second IMS tag indicating the non-IMS connection.

5. The integrated circuit of claim 4, wherein the first packets comprise packets from a first Subscriber Identity Module (SIM) having an active IMS service, and the second packets comprise packets from a second SIM with an ongoing data transfer of a non-IMS service.

6. The integrated circuit of claim 3, wherein the NAS component is configured to provide to the data plane manager component a service reject, when the IMS tag in the service request indicates the IMS connection, and when a data transfer is switched from the IMS connection to the non-IMS connection.

7. The integrated circuit of claim 6, wherein the data plane manager component is configured to, in response to the service reject, delete, based on the IMS tagging information, buffered packets having traffic flow identifiers tagged as belonging to the IMS service.

8. The integrated circuit of claim 1, wherein the traffic flow identifier of the PDN connection comprises an Evolved Packet System (EPS) bearer identifier (ID).

9. The integrated circuit of claim 1, wherein the traffic flow identifier of the PDN connection comprises a Network Service Access Point Identifier (NSAPI).

10. A User Equipment (UE) comprising:
one or more antennas;
a cellular transceiver to communicate in a cellular network; and
a communication module comprising circuitry and logic configured to store mapping information configured to map a plurality of traffic flow identifiers to Internet Protocol (IP) Multimedia Subsystem (IMS) tagging information, the IMS tagging information configured to tag a traffic flow identifier of the plurality of traffic flow identifiers as belonging to either an IMS service or a non-IMS service, the communication module configured to receive from an application a request to establish a Packet Data Network (PDN) connection, and to assign an IMS tag to a traffic flow identifier of the PDN connection, the IMS tag to indicate that the PDN connection is an IMS connection or a non-IMS connection, the communication module is configured to receive from the application a request to handle data packets having the traffic flow identifier of the PDN connection, and to process the request to handle the data packets based on the IMS tag assigned to the traffic flow identifier of the PDN connection.

11. The UE of claim 10, wherein the communication module comprises:
a data plane manager component to process the request to handle the data packets based on the IMS tag assigned to the traffic flow identifier of the PDN connection; and
a Non-Access Stratum (NAS) component configured to receive the request to establish the PDN connection, and to provide to the data plane manager component an activation indication comprising the traffic flow identifier of the PDN connection and an IMS service indication corresponding to the PDN connection.

12. The UE of claim 11, wherein the data plane manager component is configured to provide to the NAS component a service request to communicate the data packets, the service request comprising the IMS tag assigned to the traffic flow identifier of the PDN connection.

13. The UE of claim 12, wherein the NAS component is configured to prioritize communication of first data packets over second data packets, based on first and second service requests from the data plane manager component, the first service request corresponding to the first data packets and comprising a first IMS tag indicating the IMS connection, and the second service request corresponding to the second data packets and comprising a second IMS tag indicating the non-IMS connection.

14. A product comprising one or more tangible computer-readable non-transitory machine readable storage media comprising computer-executable instructions operable to, when executed by at least one processor, enable the at least one processor to cause a User Equipment (UE) to:
store mapping information configured to map a plurality of traffic flow identifiers to Internet Protocol (IP) Multimedia Subsystem (IMS) tagging information, the IMS tagging information configured to tag a traffic flow identifier of the plurality of traffic flow identifiers as belonging to either an IMS service or a non-IMS service;
receive from an application a request to establish a Packet Data Network (PDN) connection;
assign an IMS tag to a traffic flow identifier of the PDN connection, wherein the IMS tag indicates that the PDN connection is an IMS connection or a non-IMS connection;
receive from the application a request to handle data packets having the traffic flow identifier of the PDN connection; and
process the request to handle the data packets based on the IMS tag assigned to the traffic flow identifier of the PDN connection.

15. The product of claim 14, wherein the instructions, when execute, cause the UE to receive the request to establish the PDN connection at a Non Access Stratum (NAS) component, and provide from the NAS component to a data plane manager component an activation indication comprising the traffic flow identifier of the PDN connection and an IMS service indication corresponding to the PDN connection.

16. The product of claim 15, wherein the instructions, when executed, cause the UE to provide from the NAS component to the data plane manager component a service request to communicate the data packets, the service request comprising the IMS tag assigned to the traffic flow identifier of the PDN connection.

17. The product of claim 16, wherein the instructions, when executed, cause the UE to prioritize communication of first data packets over second data packets, based on first and second service requests, the first service request corresponding to the first data packets and comprising a first IMS tag indicating the IMS connection, and the second service request corresponding to the second data packets and comprising a second IMS tag indicating the non-IMS connection.

18. The product of claim 17, wherein the first packets comprise packets from a first Subscriber Identity Module (SIM) having an active IMS service, and the second packets comprise packets from a second SIM with an ongoing data transfer of a non-IMS service.

19. The product of claim 16, wherein the instructions, when executed, cause the UE to provide from the NAS component to the data plane manager component a service reject, when the IMS tag in the service request indicates the IMS connection, and when a data transfer is switched from the IMS connection to the non-IMS connection.

20. The product of claim 19, wherein the instructions, when executed, cause the UE to, in response to the service reject, delete, based on the IMS tagging information, buffered packets having traffic flow identifiers tagged as belonging to the IMS service.

21. An apparatus of cellular communication by a User Equipment (UE), the apparatus comprising:
   means for storing mapping information configured to map a plurality of traffic flow identifiers to Internet Protocol (IP) Multimedia Subsystem (IMS) tagging information, the IMS tagging information configured to tag a traffic flow identifier of the plurality of traffic flow identifiers as belonging to either an IMS service or a non-IMS service;
   means for receiving from an application a request to establish a Packet Data Network (PDN) connection;
   means for assigning an IMS tag to a traffic flow identifier of the PDN connection, wherein the IMS tag indicates that the PDN connection is an IMS connection or a non-IMS connection;
   means for receiving from the application a request to handle data packets having the traffic flow identifier of the PDN connection; and
   means for processing the request to handle the data packets based on the IMS tag assigned to the traffic flow identifier of the PDN connection.

22. The apparatus of claim 21 comprising means for receiving the request to establish the PDN connection at a Non Access Stratum (NAS) component, and providing from the NAS component to a data plane manager component an activation indication comprising the traffic flow identifier of the PDN connection and an IMS service indication corresponding to the PDN connection.

23. The apparatus of claim 22 comprising means for providing from the NAS component to the data plane manager component a service request to communicate the data packets, the service request comprising the IMS tag assigned to the traffic flow identifier of the PDN connection.

24. The apparatus of claim 23 comprising means for prioritizing communication of first data packets over second data packets, based on first and second service requests, the first service request corresponding to the first data packets and comprising a first IMS tag indicating the IMS connection, and the second service request corresponding to the second data packets and comprising a second IMS tag indicating the non-IMS connection.

* * * * *

UNITED STATES PATENT AND TRADEMARK OFFICE
CERTIFICATE OF CORRECTION

PATENT NO.         : 10,015,203 B2
APPLICATION NO.    : 14/864976
DATED              : July 3, 2018
INVENTOR(S)        : Nitin Gowda Basavarajappa et al.

It is certified that error appears in the above-identified patent and that said Letters Patent is hereby corrected as shown below:

In the Claims

Column 30, Line 66, Claim 15, delete "when execute, cause" and insert --when executed, cause--, therefor.

Signed and Sealed this
Eleventh Day of September, 2018

Andrei Iancu
*Director of the United States Patent and Trademark Office*